US012125018B2

(12) United States Patent
Vokes et al.

(10) Patent No.: US 12,125,018 B2
(45) Date of Patent: *Oct. 22, 2024

(54) TERMINAL FOR CONDUCTING ELECTRONIC TRANSACTIONS

(71) Applicant: Worldpay Limited, London (GB)

(72) Inventors: Jonathan Stewart Vokes, London (GB); Nicholas Telford-Reed, London (GB)

(73) Assignee: Worldpay Limited, London (GB)

(*) Notice: Subject to any disclaimer, the term of this patent is extended or adjusted under 35 U.S.C. 154(b) by 1056 days.

This patent is subject to a terminal disclaimer.

(21) Appl. No.: 16/197,628

(22) Filed: Nov. 21, 2018

(65) Prior Publication Data

US 2019/0108506 A1 Apr. 11, 2019

Related U.S. Application Data

(63) Continuation of application No. 15/887,506, filed on Feb. 2, 2018, now Pat. No. 11,651,347.

(30) Foreign Application Priority Data

Feb. 3, 2017 (GB) ..................... 1701816

(51) Int. Cl.
*G06Q 20/32* (2012.01)
*G06F 21/34* (2013.01)
(Continued)

(52) U.S. Cl.
CPC ....... *G06Q 20/3223* (2013.01); *G06F 21/577* (2013.01); *G06Q 20/102* (2013.01);
(Continued)

(58) Field of Classification Search
CPC .. G06Q 20/3223; G06Q 20/102; G06Q 20/32; G06Q 20/3226; G06Q 20/3265;
(Continued)

(56) References Cited

U.S. PATENT DOCUMENTS 9,704,327 B2 * 7/2017 Vawter ................ G06Q 20/102
9,710,804 B2    7/2017 Zhou et al.
(Continued)

FOREIGN PATENT DOCUMENTS

EP    2487805 A1    8/2012
EP    3109817 A1    12/2016
(Continued)

OTHER PUBLICATIONS

British Search Report issued Aug. 2, 2017 in Application No. GB1701816.9.

(Continued)

*Primary Examiner* — John W Hayes
*Assistant Examiner* — Edgar R. Martinez-Hernandez
(74) *Attorney, Agent, or Firm* — Bookoff McAndrews, PLLC

(57) ABSTRACT

A method for initiating payment transactions from a payment terminal application on a mobile electronic device may include displaying, on a display screen of the mobile electronic device, a first indicia corresponding to a wireless communication antenna location of the mobile electronic device, receiving, at the wireless communication antenna of the mobile electronic device, a first signal from an antenna located in the payment instrument, the first signal received at a first time, receiving, at the wireless communication antenna of the mobile electronic device, a second signal from the antenna located in the payment instrument, the second signal received at a second time later than the first time, determining a difference in a signal strength between the first and second signals, and displaying, on the display screen of the mobile electronic device, a second indicia based on the determined difference in signal strength.

20 Claims, 11 Drawing Sheets

(51) Int. Cl.
| | |
|---|---|
| *G06F 21/57* | (2013.01) |
| *G06Q 20/10* | (2012.01) |
| *G06Q 20/34* | (2012.01) |
| *G06Q 20/38* | (2012.01) |
| *G06Q 20/40* | (2012.01) |
| *G07F 7/08* | (2006.01) |
| *H04W 12/04* | (2021.01) |
| *H04W 12/06* | (2021.01) |
| *H04B 5/77* | (2024.01) |
| *H04W 4/80* | (2018.01) |
| *H04W 12/67* | (2021.01) |
| *H04W 12/71* | (2021.01) |

(52) U.S. Cl.
CPC ......... *G06Q 20/32* (2013.01); *G06Q 20/3226* (2013.01); *G06Q 20/3265* (2020.05); *G06Q 20/327* (2013.01); *G06Q 20/3278* (2013.01); *G06Q 20/352* (2013.01); *G06Q 20/3829* (2013.01); *G06Q 20/4014* (2013.01); *G06Q 20/40975* (2013.01); *G07F 7/0873* (2013.01); *H04W 12/04* (2013.01); *H04W 12/06* (2013.01); *G06F 21/34* (2013.01); *H04B 5/77* (2024.01); *H04W 4/80* (2018.02); *H04W 12/67* (2021.01); *H04W 12/71* (2021.01)

(58) Field of Classification Search
CPC ............. G06Q 20/327; G06Q 20/3278; G06Q 20/352; G06Q 20/3829; G06Q 20/4014; G06Q 20/40975; G06F 21/577; G06F 21/34; G07F 7/0873; H04W 12/04; H04W 12/06; H04W 4/80; H04W 12/67; H04W 12/71; H04B 5/0062
See application file for complete search history.

(56) References Cited

U.S. PATENT DOCUMENTS

| | | | | |
|---|---|---|---|---|
| 10,192,214 | B2* | 1/2019 | Jiang | G06Q 20/3676 |
| 10,216,852 | B1* | 2/2019 | Gupta | G06F 16/316 |
| 10,430,794 | B2* | 10/2019 | Hammad | G06Q 20/401 |
| 10,546,058 | B2 | 1/2020 | Balasubramanian et al. | |
| 10,963,868 | B1* | 3/2021 | McCauley | G06Q 20/10 |
| 11,062,304 | B2* | 7/2021 | Setchell | G06Q 20/3278 |
| 2004/0098350 | A1* | 5/2004 | Labrou | G06Q 20/12 |
| | | | | 705/64 |
| 2009/0063312 | A1 | 3/2009 | Hurst | |
| 2009/0124234 | A1 | 5/2009 | Fisher et al. | |
| 2010/0088237 | A1 | 4/2010 | Wankmueller | |
| 2010/0131764 | A1* | 5/2010 | Goh | H04L 9/321 |
| | | | | 713/171 |
| 2012/0078697 | A1 | 3/2012 | Carlson et al. | |
| 2012/0270528 | A1 | 10/2012 | Goodman | |
| 2012/0322374 | A1 | 12/2012 | Yamaoka et al. | |
| 2013/0124410 | A1* | 5/2013 | Kay | G07F 19/211 |
| | | | | 705/43 |
| 2013/0141567 | A1 | 6/2013 | Walker et al. | |
| 2013/0151400 | A1 | 6/2013 | Makhotin et al. | |
| 2013/0191290 | A1* | 7/2013 | Glendenning | G06Q 20/20 |
| | | | | 705/71 |
| 2013/0198046 | A1* | 8/2013 | Hammad | G06Q 40/10 |
| | | | | 705/30 |
| 2013/0246220 | A1* | 9/2013 | Hammad | G06Q 30/0267 |
| | | | | 705/26.9 |
| 2014/0040139 | A1* | 2/2014 | Brudnicki | H04W 12/068 |
| | | | | 705/44 |
| 2014/0052637 | A1* | 2/2014 | Jooste | G06Q 20/401 |
| | | | | 705/44 |
| 2014/0058897 | A1* | 2/2014 | Yang | G06Q 30/0601 |
| | | | | 705/26.61 |
| 2014/0330654 | A1* | 11/2014 | Turney | G06Q 20/14 |
| | | | | 705/15 |
| 2014/0373162 | A1 | 12/2014 | Mahaffey et al. | |
| 2015/0032529 | A1* | 1/2015 | Diachenko | G06Q 20/322 |
| | | | | 705/14.27 |
| 2015/0046330 | A1 | 2/2015 | Hanafi et al. | |
| 2015/0046339 | A1 | 2/2015 | Wong et al. | |
| 2015/0066772 | A1* | 3/2015 | Griffin | G06Q 40/08 |
| | | | | 705/44 |
| 2015/0088756 | A1* | 3/2015 | Makhotin | G06Q 20/401 |
| | | | | 705/71 |
| 2015/0095238 | A1 | 4/2015 | Khan et al. | |
| 2015/0106867 | A1* | 4/2015 | Liang | H04L 63/1433 |
| | | | | 726/1 |
| 2015/0254633 | A1* | 9/2015 | Nishizawa | G07G 5/00 |
| | | | | 705/24 |
| 2015/0254704 | A1* | 9/2015 | Kothe | G06Q 30/0225 |
| | | | | 705/14.26 |
| 2015/0278803 | A1 | 10/2015 | Champaneria et al. | |
| 2015/0312038 | A1* | 10/2015 | Palanisamy | G06Q 20/385 |
| | | | | 713/155 |
| 2015/0312217 | A1 | 10/2015 | Lee et al. | |
| 2015/0312879 | A1 | 10/2015 | Lagnado | |
| 2015/0332262 | A1 | 11/2015 | Lingappa | |
| 2015/0371210 | A1 | 12/2015 | Chatterjee et al. | |
| 2016/0036790 | A1 | 2/2016 | Shastry et al. | |
| 2016/0080152 | A1* | 3/2016 | Pieczul | G06F 21/31 |
| | | | | 713/168 |
| 2016/0092872 | A1 | 3/2016 | Prakash et al. | |
| 2016/0174038 | A1 | 6/2016 | Menardais et al. | |
| 2016/0210622 | A1* | 7/2016 | Yang | G06Q 20/3223 |
| 2016/0217448 | A1 | 7/2016 | Laracey | |
| 2016/0232515 | A1 | 8/2016 | Jhas et al. | |
| 2016/0232523 | A1 | 8/2016 | Venot et al. | |
| 2016/0267465 | A1* | 9/2016 | Metral | G06Q 20/322 |
| 2016/0307194 | A1 | 10/2016 | Bhatnagar et al. | |
| 2017/0003954 | A1* | 1/2017 | Khan | H04W 12/06 |
| 2017/0180335 | A1 | 6/2017 | Quinlan et al. | |
| 2017/0195879 | A1* | 7/2017 | Jones-McFadden | G06Q 20/36 |
| 2017/0206593 | A1* | 7/2017 | Zolotov | G06Q 30/0639 |
| 2017/0270517 | A1 | 9/2017 | Vasu et al. | |
| 2017/0286944 | A1 | 10/2017 | Brown | |
| 2018/0218356 | A1 | 8/2018 | Grassadonia et al. | |
| 2018/0300991 | A1* | 10/2018 | Park | G06K 19/07 |
| 2019/0141021 | A1* | 5/2019 | Isaacson | G06Q 50/01 |
| 2019/0236582 | A1* | 8/2019 | Colegate | H04W 12/069 |

FOREIGN PATENT DOCUMENTS

| | | |
|---|---|---|
| EP | 3118797 A1 | 1/2017 |
| WO | WO-0201462 A2 * | 1/2002 ............ G06Q 30/06 |
| WO | 2006115984 A2 | 11/2006 |
| WO | 2010031142 A1 | 3/2010 |
| WO | 2010136830 A1 | 12/2010 |
| WO | WO 2016/068006 A1 | 5/2016 |
| WO | WO 2016/141523 A1 | 9/2016 |
| WO | WO 2016/185769 A1 | 11/2016 |

OTHER PUBLICATIONS

GB Search Report in Application No. GB 2118816.4, dated Jan. 14, 2022 (2 pages).
GB Combined Search and Exam Report in Application No. GB 2118816.4, dated Jan. 17, 2022 (7 pages).
International Search Report issued in U.K application No. 18707128.7 on Jul. 9, 2018.
Written Opinion of the International Searching Authority issued in U.K application No. 18707128.7 on Apr. 28, 2021.

* cited by examiner

TERMINAL FOR CONDUCTING ELECTRONIC TRANSACTIONS

CROSS-REFERENCE TO RELATED APPLICATION(S)

This patent application is a continuation of and claims the benefit of priority to U.S. patent application Ser. No. 15/887,506, filed Feb. 2, 2018, which claims the benefit of priority under 35 U.S.C. § 119 to British Patent Application No. 1701816.9, filed on Feb. 3, 2017, the entirety of each of which is incorporated herein by reference.

FIELD OF INVENTION

The present invention relates to terminals for conducting electronic transactions and in particular to an application-based payment terminal that does not make use of secure hardware such as a secure element or additional card reading device.

BACKGROUND

Payment terminals are expensive bespoke pieces of hardware that are designed and manufactured to last for a significant length of time, e.g. over 7 years according to some specifications. The majority of the security features within a payment terminal are focused on either a) protecting the entry of secure data such as a Personal Identification Number (PIN) into the payment terminal's keypad or b) the use of encryption keys to encrypt payment data for transport. Should a payment terminal become compromised, in many cases the terminal's hardware model has to be completely replaced to ensure the security of future use of that payment terminal model to make payments. As each particular type of terminal is designed according to a common specification, a breach of one particular model of terminal can compromise all of the terminals of the same model. There can be millions of installations of a particular model of terminal meaning that a breach in the security of just one terminal can be very costly and time consuming to deal with.

Payment terminals of the type known in the art include a secure element which is a tamper-resistant element (e.g. a microcontroller) that is capable of securely executing one or more applications that implement functionality required of a payment terminal. The secure element is also capable of storing securely storing or encrypting data such as cryptographical data or encryption keys and/or confidential data. Typically a trusted authority produces a set of standards that a secure element must meet in order to be deployed in a particular environment such as the electronic payment industry. A common method of protecting a secure element in a payment device is to provide physical protections such as tamper switches that detect an attack on the terminal. An attack usually involves an attempt to gain access to the terminal's internal hardware such as the secure element itself. If an attack is detected, the physical protections act in some way to delete or otherwise render unusable sensitive data stored on the terminal so that it is not recoverable by the attacker.

However, if an attacker can find a way to bypass these protections then the payment terminal can be compromised. Extraction of sensitive data may allow the attacker to obtain information that enables fraudulent activity to be carried out. Moreover, since each terminal of a particular model shares a common design, finding a method of circumventing the protection for one terminal allows an attacker to attack all other terminals of the same model in the same way. This leads to the necessity of physically replacing all terminals that share the compromised terminal's physical protections against tampering. This replacement process is very time consuming and expensive.

Payment terminals are vulnerable to attack during transit from the manufacturer to the final merchant location. As a result, there is a complex chain of custody for the journey from manufacturer to merchant. Once received by the merchant, an authentication process takes place where the terminal is provisioned with encryption keys and unique information (called Point to Point encryption or P2PE in the industry). Typically this information does not change for the life of the terminal, leaving this data subject to attack for the entire life of the terminal. This could be, for example, 7 years. In many cases the authentication process is a time consuming and laborious manual process; for example, the merchant may contact the payment terminal provider by telephone to work through a set of manual steps that result in encryption keys being provisioned on the terminal.

Relatively recently it has become possible to use mobile phones and particularly smartphones as payment terminals, replacing the traditional 'Pin Entry Device' (PED) as would traditionally be found on the counter of a merchant's premises. Currently implementations of smartphone based terminals use add-ons in the form of a hardware module which may be in the form of an additional card reading device that provides encryption for the payment transaction and sometimes encryption for the cardholder's PIN. Examples are head-phone jack based devices, and Bluetooth connected PEDs. These hardware modules have to go through complex security hardening and evaluation mandated by payment schemes. However, as in the case of a 'traditional' payment terminal discussed above, if the security of one of these hardware modules was broken it may become necessary to issue thousands or even millions of replacement modules at significant cost and effort.

In addition to the cost and effort involved in physically replacing compromised payment terminals, it may be some time before replacement of each individual payment terminal or hardware module is complete. This is particularly the case where thousands or millions of payment terminals are in use, potentially over a wide geographical area. This could render a payment terminal user such as a merchant unable to take electronic payments whilst a replacement for a compromised payment terminal is sourced and provided.

A problem related to the above is that smartphones and other such electronic devices typically include NFC antennas that are not capable of producing an NFC field of the strength typically found in traditional counter-top payment terminals. This can make the process of placing a payment instrument within the NFC field somewhat time consuming and cumbersome as the cardholder may need to move the payment instrument around a significant amount before it is successfully read.

It would be desirable to provide a payment terminal that can be quickly and easily replaced should it, or another like it, become compromised in some way. It would also be desirable to provide a payment terminal that does not rely on specialist hardware such as a secure element or secure hardware module of a card reader in order to protect secret information. It would further be desirable to provide a mechanism for a cardholder to quickly and easily move their payment instrument within the NFC field of the electronic device that is acting as a payment terminal in order to complete a successful read of the payment instrument by the electronic device

SUMMARY OF THE INVENTION

Many electronic devices such as smartphones include Near Field Communication (NFC) reader/writers as a standard feature. Often the device operating system allows software applications executing on the device to access an NFC controller directly, enabling the application to control the NFC reader.

One way in which this capability has been made use of is Host Card Emulation (HCE). HCE involves issuing payment credentials to an application stored on an electronic device to enable the electronic device to perform payments via NFC communication with a payment terminal ('contactless payments'). In effect, HCE transforms an electronic device into a secure payment instrument that is equivalent in function to a traditional 'contactless' credit card or debit card.

The present invention is distinguished from HCE in that in the present invention the electronic device emulates the payment terminal rather than the payment card. This is referred to in this specification as Host Terminal Emulation (HTE). HTE allows an NFC-enabled electronic device to securely take electronic payments via a HTE application that is executing on the electronic device. The HTE application may also be referred to herein as an application-based payment terminal. The HTE application takes exclusive control of the electronic device's NFC controller to allow the electronic device to communicate with an NFC-enabled payment instrument so as to obtain cardholder information. The NFC-enabled payment instrument could be an NFC-enabled payment card (a 'contactless payment card') or it could be another electronic device implementing HCE. Although described in the context of NFC, it will be appreciated that this invention could be implemented using another communication protocol such as Bluetooth, RFID, WiFi, etc.

As part of the HTE payment process, the electronic device receives sensitive card data and cardholder data from the payment instrument. The card data and cardholder data are routed from the NFC controller to the operating system of the electronic device. The operating system then sends this data on to the HTE application. However the sensitive data is sent in plain text form from the operating system to the HTE application. This means that, if an attacker were able to bypass the operating system, or break the HTE application security, then it would be possible for the attacker to harvest card and cardholder information directly as it is available in plain text form. The information available would not usually include the Card Security Code (CSC) or the cardholder name, but the card data (PAN, Track-2 equivalent data) and cardholder data such as email address or mobile phone number could be used as the basis to form a phishing attack, or used in fraudulent e-commerce transactions where cardholder name or CSC is not required.

In order to mitigate this risk, the present invention can perform various periodic security checks such that it is very difficult if not impossible for secret information to be extracted by an attacker. This system thus allows an electronic payment to be taken in a secure manner. Importantly, no specialist hardware is required by this system. In particular, the electronic device does not require a secure element, nor does it require a secure hardware module, so the electronic device may be termed as 'unsecure'.

The invention relates to a secure application-based payment terminal that executes on the electronic device. As used in this specification, the term 'application-based payment terminal' comprises the HTE application and a local risk engine that is operable to continuously monitor the state of the electronic device and to take remedial action should evidence be uncovered that the electronic device may have been compromised in some way. Such action can include but is not limited to degrading the functionality of the HTE application and/or taking steps to prevent confidential and/or secure information that is present on the electronic device from being available for access by an attacker. A server risk engine is also provided in a remote data centre and the local risk engine can communicate with the server risk engine in order to seek instructions. The server risk engine can also push instructions to the local risk engine at any time, which instructions may cause the local risk engine to take steps to prevent confidential and/or secure information that is present on the electronic device from being available for access. In this way the present invention provides a secure application-based payment terminal that makes it very difficult if not impossible for an attacker to harvest sensitive, confidential and/or secure data from the electronic device. The local risk engine can also act alone (without reference to the server risk engine) in the case that it cannot connect to the server risk engine or the risk is deemed too high and the local risk engine decides to act now before seeking instruction form the server risk engine. This is explained in more detail in the 'detailed description of embodiments' section set out below.

In a first aspect the invention provides a computer implemented method for providing an application-based payment terminal on an electronic device, the electronic device comprising a volatile storage module, a user input module and a network interface module, the method comprising: receiving user credentials from the user input module; transmitting an authentication request message to a remote data centre via the network interface module, the authentication request message including the user credentials; receiving an authentication response message from the remote data centre, the authentication response message including an indication as to whether authentication was successful; and in the event authentication was successful, the method further comprising provisioning the application-based payment terminal on the electronic device by: receiving at least one encryption key from the data centre; and storing the at least one encryption key in the volatile storage module.

In a second aspect the invention provides A computer readable storage medium having instructions stored thereon which, when executed by a computer, cause the computer to perform the method of the first aspect.

In a third aspect the invention provides a terminal for conducting an electronic transaction provided according to the method of the first aspect.

In a fourth aspect the invention provides a method of generating an indicia representative of the location of a radio frequency identification antenna within an electronic device, the electronic device comprising a display screen for displaying the indicia, the method comprising: determining a type of the electronic device; querying a lookup table, the lookup table containing at least one electronic device type and at least one associated radio frequency identification antenna location; displaying the indicia on the display screen at the location corresponding to the electronic device type.

In a fifth aspect the invention provides a method of analysing the signal strength of an antenna located in a payment instrument, the method comprising: receiving, at a wireless communication antenna located within an electronic device, a first signal from the antenna located in the payment instrument, the first signal received at a first time; receiving, at the wireless communication antenna located within an electronic device, a second signal from the antenna located in the payment instrument, the second signal received at a second time; the second time later than the first time; determining a difference in the signal strength between the first and second signals; and displaying, on a display of the electronic device, an indication based on the determination.

Further optional features of the invention are set out in the appended dependent claims.

BRIEF DESCRIPTION OF THE DRAWINGS

Embodiments of the present invention are now described, by way of example only, with reference to the accompanying drawings, in which.

DETAILED DESCRIPTION OF EMBODIMENTS

Figure 1:
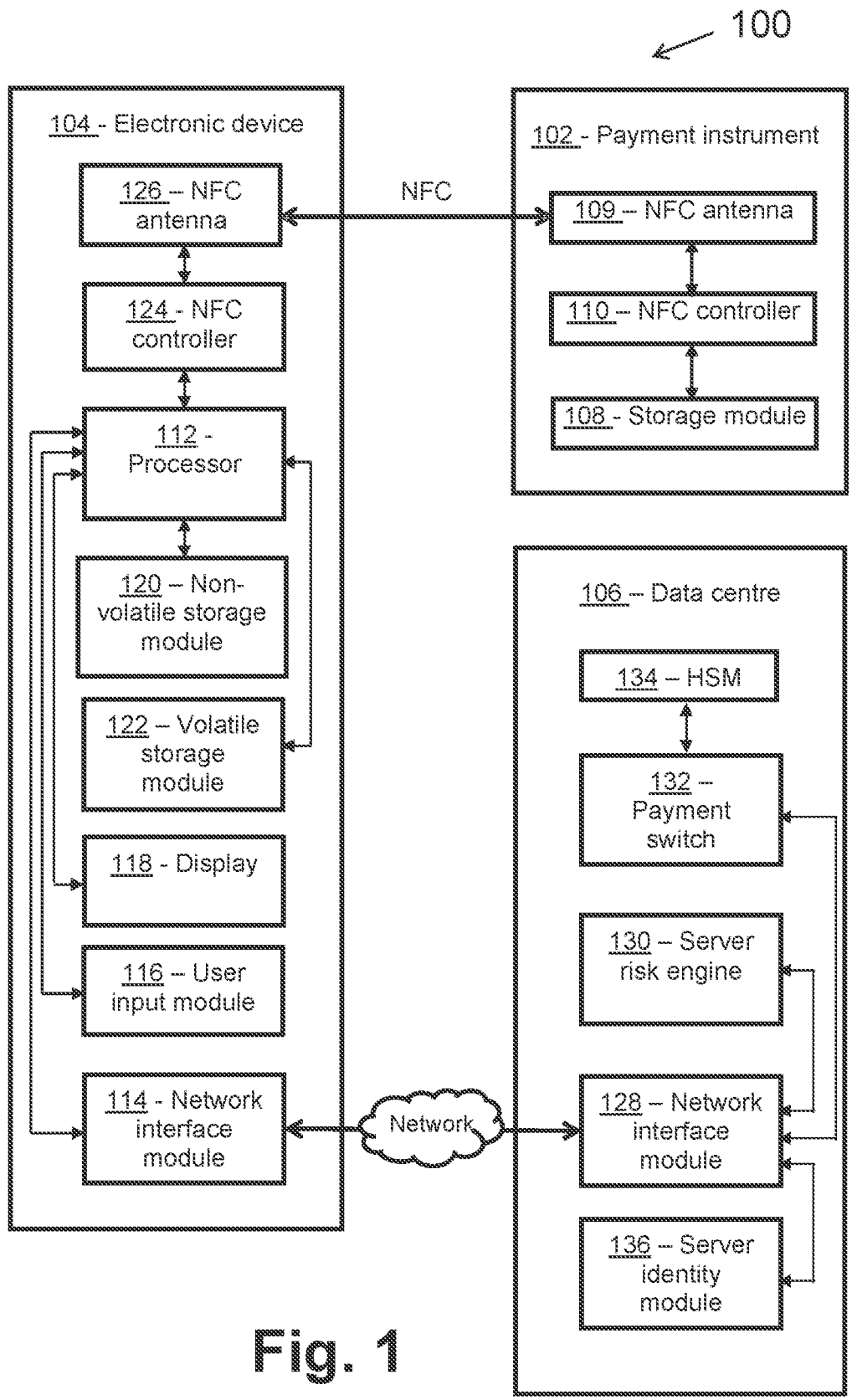
FIG. 1 is a diagram of a system that is suitable for implementing the present invention.

FIG. 1 shows a schematic diagram of a system 100 suitable for implementing all embodiments of the present invention. System 100 includes a payment instrument 102, an electronic device 104 and a data centre 106. Each of these elements is described in turn below.

Payment instrument 102 can be any payment instrument known to a skilled person. For example, payment instrument 102 can be a plastic payment card of the type well known in the art. Alternatively, payment instrument 102 can be a smartphone or other such electronic device having payment credentials provisioned onto it, as is known in the art.

Payment instrument 102 includes a storage module 108 on which data relating to payment instrument 102 is stored. The data may include, for example, a Primary Account Number (PAN) associated with the card, the name of an authorised user, an expiration date of the card, a service code obtained from the payment instrument and/or any other data deemed useful by a skilled person. In the case where payment instrument 102 is a payment card, storage module 108 is an integrated circuit. However, other suitable storage means may be used instead. In the case that payment instrument 102 is a provisioned electronic device, storage module 108 is a secure element of the type known in the art.

Payment instrument 102 additionally includes a Near Field Communication ('NFC') antenna 109 to allow it to communicate wirelessly with electronic device 104, and a NFC controller 110 to control operation of this antenna. Payment instruments having NFC capabilities are known in the art as 'contactless' payment instruments. In the following discussion antenna 109 is a NFC antenna of the type known in the art; however, it will be appreciated that antenna 109 can be an antenna that communicates using another wireless standard; e.g. Bluetooth, WiFi, RFID, etc., including any standards not currently known but which are developed in the future. It will be appreciated that in such cases NFC controller 110 is replaced with a controller suited to operating antenna 109 according to the required standard, e.g. a Bluetooth controller.

System 100 also includes an electronic device 104. In the present embodiment electronic device 104 is a smartphone that is running a version of the Android operating system, but it will be appreciated that the invention is not limited to this and electronic device 104 can be any device that is capable of storing and executing the HTE application that is discussed later in this specification. It will be appreciate that, in the interests of brevity, only those elements of electronic device 104 that are pertinent to the present invention are shown in FIG. 1 and that consequently device 104 may include one or more additional non-illustrated components and/or modules.

Electronic device 104 includes a processor 112 that is configured to control the operation of the other components of electronic device 104, including any combination of network interface module 114, user input module 116, display 118, non-volatile storage module 120, volatile storage module 122 and NFC controller 124. Processor 112 can control any of these components in order to achieve a given objective. It will also be appreciated that electronic device 104 may include other hardware and/or software components that are not explicitly shown in FIG. 1, and further that processor 112 may be configured to control one or more of any such further components. Processor 112 comprises any suitable data processing means, and in this embodiment processor 112 is a microcontroller.

Processor 112 is configured to execute one or more applications ('apps'), including the HTE application that is described in detail later in this specification. Processor 112 is communicatively coupled to NFC controller 124, and NFC controller 124 is in turn communicatively coupled to an NFC antenna 126. This arrangement allows electronic device 104 to receive data from payment instrument 102 via NFC antenna 109 using well known NFC communication techniques. This arrangement of hardware and its operation to transmit and receive data is well known in the art and hence is not described in detail here. It will be appreciated that NFC controller 124 can be replaced with, or provided in addition to, any other network interface component, such as a Wi-Fi module and/or a Bluetooth module.

Preferably, processor 112 has two operation modes; a 'normal' mode and a secure 'Trusted Execution Environment' ('TEE') mode. In the normal mode processor 112 operates in an open manner such that all of its processing resource is available to the operating system and any executing applications. In TEE mode processor 112 makes a portion of its processing resource available as an isolated execution zone in which integrity and confidentiality of the processed data is guaranteed. Only the application(s) that is/are associated with the isolated execution zone have access to the processing resource in this zone. The operating system and other applications cannot access the processing resource in the isolated execution zone, meaning that the integrity and confidentiality of data in the isolated execution zone is guaranteed. Encryption may be made use of in the isolated execution zone to further improve security as this prevents applications that are sharing the isolated execution zone from accessing one another's data. In a particularly preferred implementation, NFC controller 124 is connected directly via a trusted interface into the isolated execution zone of processor 112. This allows confidential data such as cardholder information that is received from payment instrument 102 via NFC antenna 126 to be transported and processed securely within electronic device 104. While this feature is preferred, it is not essential to the working of the present invention as the present invention can provide a secure application-based payment terminal without making use of a processor having TEE capabilities. The present invention can be implemented with the HTE application executing in a normal environment or a TEE. 'Trusted Execution Environment' ('TEE') is an example of a secure mode but other types of trusted computer modes may be used instead of TEE, where the processor has a portion of its resource available in an isolated, more secure execution zone rather than having an additional dedicated processor being used with a secure element as may be the case in known systems where separate secure elements are used.

Electronic device 104 additionally includes a network interface module 114 that is configured to transmit data from electronic device 104 and to receive data at electronic device 104. Network interface module 114 is well known in the art and as such is not described in further detail here. Network interface module 114 is connectable to any suitable private or public network, such as the Internet. Network interface module 114 is configured to communicate with data centre 106 such that electronic device 104 and data centre 106 can exchange data. Preferably network interface module 114 implements some form of secure communication protocol, e.g. Transport Layer Security (TLS).

Electronic device 104 further includes a user input module 116 that is configured to accept input from a user. In this embodiment, user input module 116 is a touchscreen of the type known in the art and used frequently for smartphones. However, other suitable user input means such as buttons, sliders, touchpads, etc. can be used in place of a touchscreen. Preferably user input module 116 is provided in a form in which it is possible to minimise the risk of user input being surreptitiously circumvented or monitored, e.g. via keylogging or shoulder surfing. In the present embodiment user input module 116 includes a software keyboard (not shown) that provides a Graphical User Interface (GUI) with alphanumeric keys for a user to interact with. Preferably, for greater security, the software keyboard is a bespoke keyboard specifically associated with the HTE application. Alternatively, it may be the 'native' or 'stock' software keyboard that is provided with the native operating system of the electronic device 104, or a third party software keyboard that is provided by a trustworthy organisation. Third party software keyboards provided by organisations of unknown trustworthiness are preferably not made use of in connection with the present invention to reduce the risk of keylogging attacks. As multiple software keyboard can be installed in parallel, the user may be provided with a means to switch between software keyboards when using the HTE application that is discussed later in this specification. Preferably the HTE application is configured to prevent itself from operating if a software keyboard is in use that cannot be verified as originating from a trustworthy source.

Electronic device 104 also includes a display 118 capable of displaying a Graphical User Interface (GUI) of the type known in the art to a user. The display is preferably a touch screen display as known in the art such that the functionality of display 118 and user input module 116 is integrated into a single item of hardware. Electronic devices that do not include an integrated display 118 are also contemplated. For example, display 118 can also be a remote display that is provided on another device, for example used when a wearable communicates to the user via an interface on a mobile telephone. Display 118 is not limited to being a visual display, and alterative 'display' means such an audio interface, or other human interface (e.g. haptic, audio, braille, smell, etc.), can be used in place of a visual display.

Electronic device 104 further includes a non-volatile storage module 120 on which data is stored in a persistent manner such that the data survives powering down of electronic device 104. In the illustrated embodiment module 114 is a flash memory module but other suitable non-volatile memory modules can be used instead. Non-volatile storage module 120 is preferably an integrated module that is not removable from the housing of electronic device 104. The present invention is compatible with an electronic device that includes a removable non-volatile storage medium such as a Secure Digital ('SD') card, but in that case it is preferable that the HTE application does not make use of the SD card for storage of data. It is also preferable that the HTE application does not allow itself or any of its files to be stored on the SD card.

Electronic device 104 also includes a volatile storage module 122 on which data is stored in a non-persistent manner such that the data does not survive powering down of electronic device 104. It also will not survive a memory cleaning process in the operating system which may clear applications from memory from time to time. In the illustrated embodiment volatile storage module 122 is a Random Access Memory (RAM) module of the type well known in the art, but other suitable volatile storage media known to the skilled person can be used instead.

Figure 2:
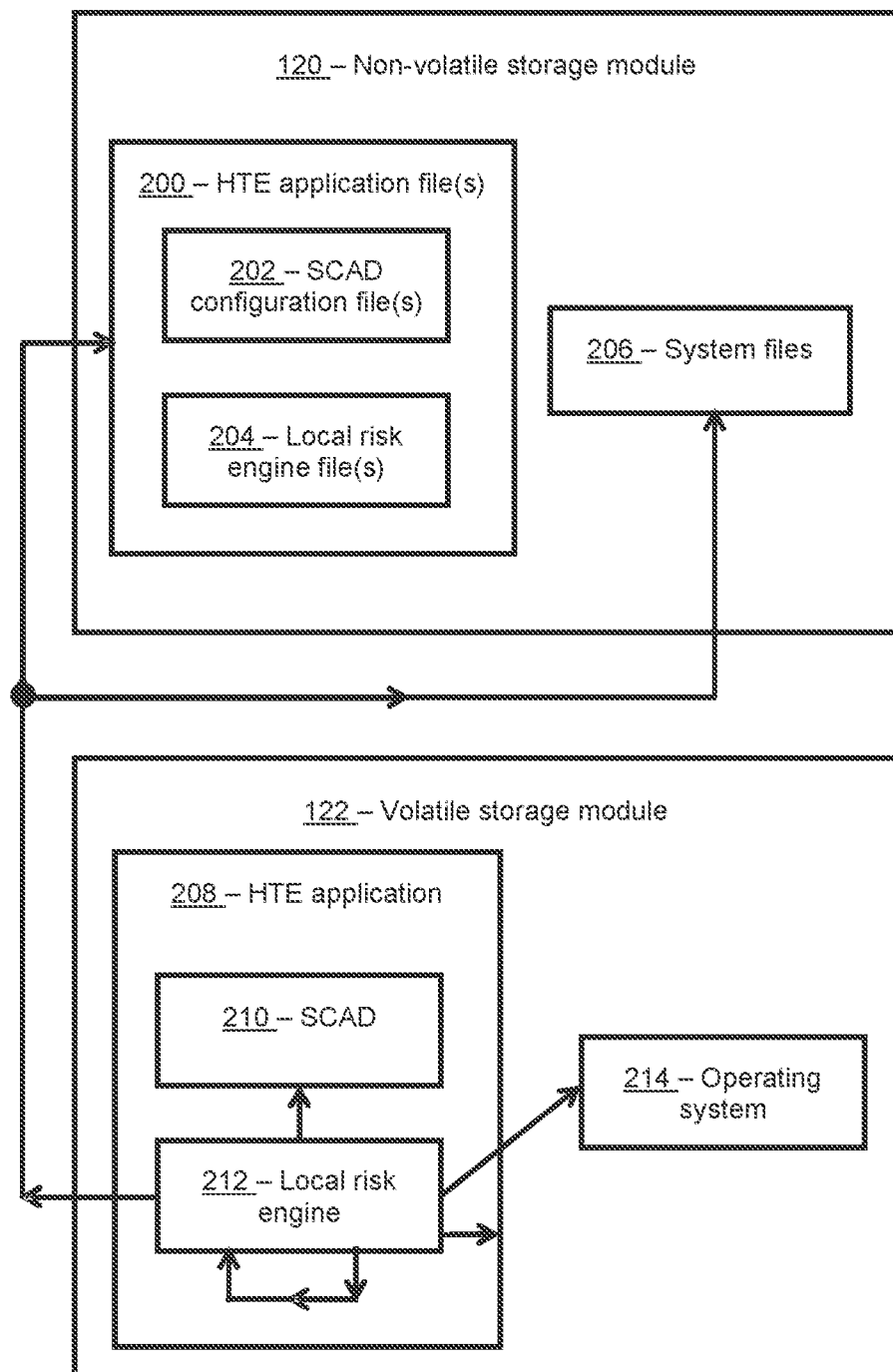
FIG. 2 is a diagram showing the contents of a non-volatile storage module and a volatile storage module that form part of an electronic device implementing the present invention.

The contents of non-volatile storage module 120 and volatile storage module 122 are shown in FIG. 2. It will be appreciated that only the contents of these modules that are pertinent to the present invention are shown in FIG. 2, and that each module can contain additional items that are not shown.

Non-volatile storage module 120 includes HTE application files 200 which comprise one or more files that are required for electronic device 104 to successfully run the HTE application. HTE application files 200 can include, for example, one or more executable files and/or one or more configuration files. In the case of the Android operating system, the HTE application files 200 can include one or more Dalvik Executable files (.dex) and/or one or configuration files such as Extensible Mark-up Language (XML) files and/or text files. A skilled person will be familiar with suitable file formats for other operating systems.

Whatever their form, as part of the HTE application files 200 there is provided Software Card Acceptance Device ('SCAD') configuration file(s) 202. As described in more detail later in this specification, a SCAD is the component of the HTE application that stores secure and/or confidential information such as cardholder information and encryption keys. The HTE application cannot act as a payment terminal without a properly configured SCAD. The SCAD configuration files 202 contain all of the information required by the HTE application to construct a new instance of a SCAD in the volatile storage module 122. It is important to appreciate that SCAD configuration files 202 do not contain any sensitive and/or confidential data such as cardholder data and encryption key(s). This means that an attacker cannot gain any secure information by inspection of SCAD configuration files 202.

When first initialised, SCAD 210 does not contain any confidential and/or secret information such as encryption keys. A freshly initialised SCAD 210 is therefore unable to operate as a payment terminal. It is only once the SCAD instance 210 has been provisioned with encryption keys provided by data centre 106 that the SCAD instance can act as a payment terminal. This means that a SCAD instance that is created from a compromised version of SCAD configuration files 202 cannot be used to harvest secret and/or confidential information such as encryption key(s). As used in this specification, a 'provisioned SCAD instance' or similar is referring to a SCAD instance that contains the encryption key(s) required for it to take electronic payments. HTE application files 200 also include local risk engine files 204. The local risk engine files 204 contain all of the information required by the HTE application to construct a new instance of a local risk engine in the volatile storage module 122.

Preferably HTE application files 200, SCAD configuration files 202 and local risk engine files 204 are all written using robust code obfuscation techniques of the type known in the art to mitigate the risk of them being reverse engineered by a third party. Some or all of the aforementioned files may be encrypted to prevent them from being read by a third party. Preferably the source code relating to these files is written in a controlled development environment using secure coding and development practices as known in the art, e.g. the National Institute of Standards and Technology (NIST) IST SP800-64 standard. This prevents the source code from being tampered with before it is compiled and released. Preferably, released versions of the HTE application either do not contain any debugging switches or have all debugging switches disabled.

It should be noted that the 202 and 204 do not need to be present. In an alternative technique, the SCAD can be created purely from data stored in the server. In this case non-volatile storage is never used and only volatile storage is used.

Non-volatile storage module 120 also includes system files 206. These are files that are not related to the HTE application itself; for example, operating system files and/or files relating to other applications that are installed on electronic device 104.

HTE application files 200 can be installed on electronic device 104 via an installer utility obtained from a repository that is external to electronic device 104. Preferably, the repository is a trusted repository that guarantees that the application files are genuine files that have not been tampered with by a third party. In the case of the Android operating system, the repository may be the Google Play store and the installer utility may be an Android application package (.apk).

Volatile storage module 122 includes an instance of the HTE application 208. This instance is generated from HTE application files 200 in response to a user initialisation request. The initialisation request could be, for example, processor 112 receiving input from user input module 116 indicating that the user wishes to invoke an instance of the HTE application so as to make use of the functionality of the HTE application. This may be the result of a user selecting an icon associated with the HTE application, for example. Mechanisms for invoking an application are well known to a skilled person and so are not described in detail here. It will be appreciated that the HTE application 208 is non-persistent as it is stored in volatile storage module 122 only. This means that, if electronic device 104 is powered down, the instance of HTE application 208 will no longer be available. Additionally, should the region of volatile storage module 122 that an instance of HTE application 208 resides in be required by the operating system for use with another application or process, the instance of HTE application 208 will no longer be available as it will be overwritten.

The HTE application 208 includes an instance of a SCAD 210 and an instance of a local risk engine 212. SCAD instance 210 is generated by HTE application 208 from SCAD configuration files 202 and local risk engine instance 212 is generated by HTE application 208 from local risk engine files 204. As soon as it has been initialised, local risk engine 212 begins monitoring the status of electronic device 104 to determine whether electronic device 104 is secure. This monitoring can include listening for events that are raised by the operating system 214, listening for messages from server risk engine 130, scanning files stored in non-volatile storage 120, monitoring the activity of other components in electronic device 104, e.g. NFC antenna 126 and NFC controller 124, and/or gathering data from one or more sensors associated with electronic device 104 such as an accelerometer, a barometer, a microphone and/or a camera. Further details about this are provided later in this specification in connection with FIG. 3.

Some operating systems, e.g. Android, provide the functionality for a screenshot of an executing application to be displayed in a task manager. Preferably HTE application 208 is configured to obscure any such screenshot in a manner such that GUI elements of the HTE application are not visible to a user making use of the task manager. HTE application 208 may edit a screenshot image file stored in non-volatile storage 120 to apply a blur effect or filter such that when the screenshot is displayed in the task manager it is not possible to clearly pick out any of the GUI elements of the HTE application. Alternatively, the HTE application may replace the screenshot image file produced by the operating system with a different image file that does not show any GUI elements of the HTE application, e.g. a blank image.

As shown in FIG. 2, local risk engine 212 is configured to check the status of HTE application files 200 and/or system files 206. Preferably this check is performed as soon as possible after initialisation of local risk engine 212. More information is provided about this check later in this specification in connection with FIG. 3. Preferably, the check is performed regardless of whether the HTE application is the currently active application or running in the background whilst the user interacts with another, different application.

Local risk engine 212 can also be configured to monitor any combination of its own instance in the volatile storage module 122, the instance of HTE application 208 in the volatile storage module 122, the instance of SCAD 210 in volatile storage module 122, and/or the instance of the operating system 214 in volatile storage module 122. This allows local risk engine 212 to detect attempts to read and/or modify data stored in memory addresses that are associated with or otherwise relevant to HTE application 208. Such modification could be evidence of an attempt to tamper with the operation of HTE application 208 or to extract secret and/or confidential information directly from memory. Local risk engine 212 can be configured to take preventative or remedial action should any such attempts be detected.

Local risk engine 212 can be configured to access and act upon a local risk engine rule set (not shown) that define actions that are to be taken in response to certain inputs, detected events, etc. The following table is a non-exhaustive list of exemplary rules that may be included as part of the local risk engine rule set:

TABLE 1 exemplary rules for the local risk engine rule set

| Rule identifier | Input | Action |
|---|---|---|
| R1 | Operating system version not supported | Inform user that HTE application cannot be used; close HTE application |
| R2 | HTE application files not verified as genuine or identified as corrupted | Inform user that HTE application cannot be used and prompt user to download HTE application files from a trusted source; close HTE application |
| R3 | No passcode and/or screen lock detected for electronic device | Inform user that a passcode and/or screen lock must be set on electronic device in order to use HTE application; close HTE application |
| R4 | Electronic device model not supported | Inform user that HTE application cannot be used on the detected device model; close HTE application |

The rules may be dynamic in that they can be modified by local risk engine 212 based on the current state of electronic device 104. Local risk engine 212 may include a machine learning component of a type known in the art that gathers information and uses this information to modify the local risk engine rule set. The machine learning component can be, for example, an artificial neural network of a type known in the art. The local risk engine rule set is preferably stored in an encrypted form on non-volatile storage module 113 as part of the local risk engine files 204. The local risk engine rule set can be updated at any time by an update pushed from data centre 106 to electronic device 104.

Volatile storage module 122 also includes operating system 214. It is well known in the art for operating system instances to exist in volatile storage such as RAM and as such this is not described in further detail here. Other applications may also be present in volatile storage module 122.

Returning now to FIG. 1, electronic device 104 additionally includes a NFC controller 124 and a NFC antenna 126. These components are the same as and operate in the same manner as NFC controller 110 and NFC antenna 109 of payment instrument 102, respectively. NFC antenna 126 is used to communicate with payment instrument 102 to allow data to be transmitted from payment instrument 102 to electronic device 104. It will be appreciated that in the case where a communication protocol other than NFC is used, NFC controllers 110, 124 and NFC antennas 109, 126 would be exchanged for respective controllers and antennas that support the relevant communication protocol (e.g. Bluetooth, WiFi).

Electronic device 104 is preferably a portable electronic device; i.e. it is suitable for being carried around on a user's person. However, the invention is not limited in this respect. In the illustrated embodiment electronic device 104 is a mobile telephone, preferably a smartphone, but it will be appreciated that the invention is not limited in this respect and that device 104 could be any of a tablet, a smart television, a wearable electronic device like a smart watch, car, drone etc. Other suitable electronic devices compatible with the present invention will be apparent to a skilled person having the benefit of the present disclosure.

Electronic device 104 may include a secure element (not shown) of the type known in the art. A secure element is a tamper-resistant element (e.g. a microcontroller) that is capable of securely executing one or more applications that implement functionality required of a payment terminal. It is important to note that the present invention does not make use of any secure element that is included in electronic device 104. Therefore, whilst present invention can be implemented by an electronic device including a secure element, this is not required by the invention. Any secure element that is included in electronic device 104 is effectively ignored by the present invention and is not made use of.

System 100 further includes a data centre 106 that is configured to transmit data to and receive data from electronic device 104 via any suitable private and/or public network, e.g. the Internet. Data centre 106 comprises one or more server computers of the type well known in the art. Data centre 106 may comprise a number of server computers that are geographically distributed over a wide area (such as The Cloud), or it may comprise a one or more commonly located server computers, or a combination thereof.

Data centre 106 includes a network interface module 128 that is configured to transmit and receive data. Network interface module 128 may include a router that may be referred to as a 'channel router'. The channel router functions to read the address of an incoming data packet and to route the data packet to the correct component within data centre 106, and also to read the address of an outgoing data packet and to route the data packet to the correct external location (e.g. network interface module 114 of electronic device 104). This type of routing operation is well known in the art and as such is not described further here. Network interface module 128 is connectable to any suitable private or public network, such as the Internet. Network interface module 128 is configured to communicate with electronic device 104 such that electronic device 104 and data centre 106 can exchange data.

Data centre 106 also includes a server risk engine 130. This is a component that is configured to monitor the state of the HTE application and to send instructions to local risk engine 212 where necessary. Server risk engine 130 can be configured to access and act upon a server risk engine rule set (not shown) that define actions that are to be taken in response to certain inputs, detected events, etc. In this regard the operation of server risk engine 130 is identical to that of local risk engine 212.

The server risk engine rule set can include rules that are the same as or similar to rules in the local risk engine rule set. The server risk engine rule set can also include rules that are different from the rules in the local risk engine rule set. In particular, the server risk engine rule set may include rules that are formulated based on aggregated data sources and/or data sources external to system 100. One example could be a rule based on information aggregated from many different electronic devices that are all executing an instance of the HTE application; e.g. a rule based on the volume of transactions expected to be encountered at a given time of day. Another example could be a rule based on information obtained from a mobile device manufacturer, e.g., a blacklist that identifies handsets that are known to have been stolen.

The rules in the server risk engine rule set are preferably dynamic in that they can be modified by server risk engine 130 in response to new information. For example, a rule relating to the expected volume of transactions at a given time of day may be adjusted to reflect recently acquired historical data that indicates that there has been a short-term surge in transactions due to a seasonal sale. Server risk engine 130 may include a machine learning component of a type known in the art to gather and process information so as to modify the server risk engine rule set. The machine learning component can be, for example, an artificial neural network of a type known in the art.

Server risk engine 130 is also configured to receive information from local risk engine 212 in the form of a security event log. The security event log provides details of each security event encountered by a given instance of local risk engine 212. Server risk engine 130 may be configured to process a security event log and, based on the server risk engine rule set, take appropriate action. The action taken may include storing the security event log in a repository, providing the security event log as input to a machine learning system, and/or transmitting one or more instructions to local risk engine 212 to cause HTE application 208 to alter its operation in some way.

Data centre 106 additionally includes a payment switch 132 that comprises one or more server computers that are configured to securely provision a SCAD instance with the encryption key(s) necessary for the SCAD to act as a payment terminal. This process is described in detail later in this specification in connection with FIGS. 4a and 4b. Payment switch 132 is communicatively coupled to Hardware Security Module (HSM) 134. As is known in the art, HSM 134 generates, stores and manages digital cryptographic keys in a highly secure manner. A HSM is thus suitable for storing the private encryption key of an asymmetric key pair, for example. Payment switch 132 also handles approval of transactions made by a provisioned HTE application.

Data centre 106 further includes a server identity module 136 that is configured to authenticate logon credentials that are supplied to HTE application 208 by a user via user input module 116. The authentication of logon credentials is explained later in this specification in connection with FIGS. 4a, 4b and 5. Server identity module 136 comprises one or more server computers that may either incorporate a database (not shown) or which are communicatively coupled to a database. The database contains information relating to users that have subscribed to an application-based payment terminal service as provided by HTE application 208. The database may contain user information such as a user name, a legal name, a merchant identification name and/or number, a user and/or merchant address, etc.

Figure 3:
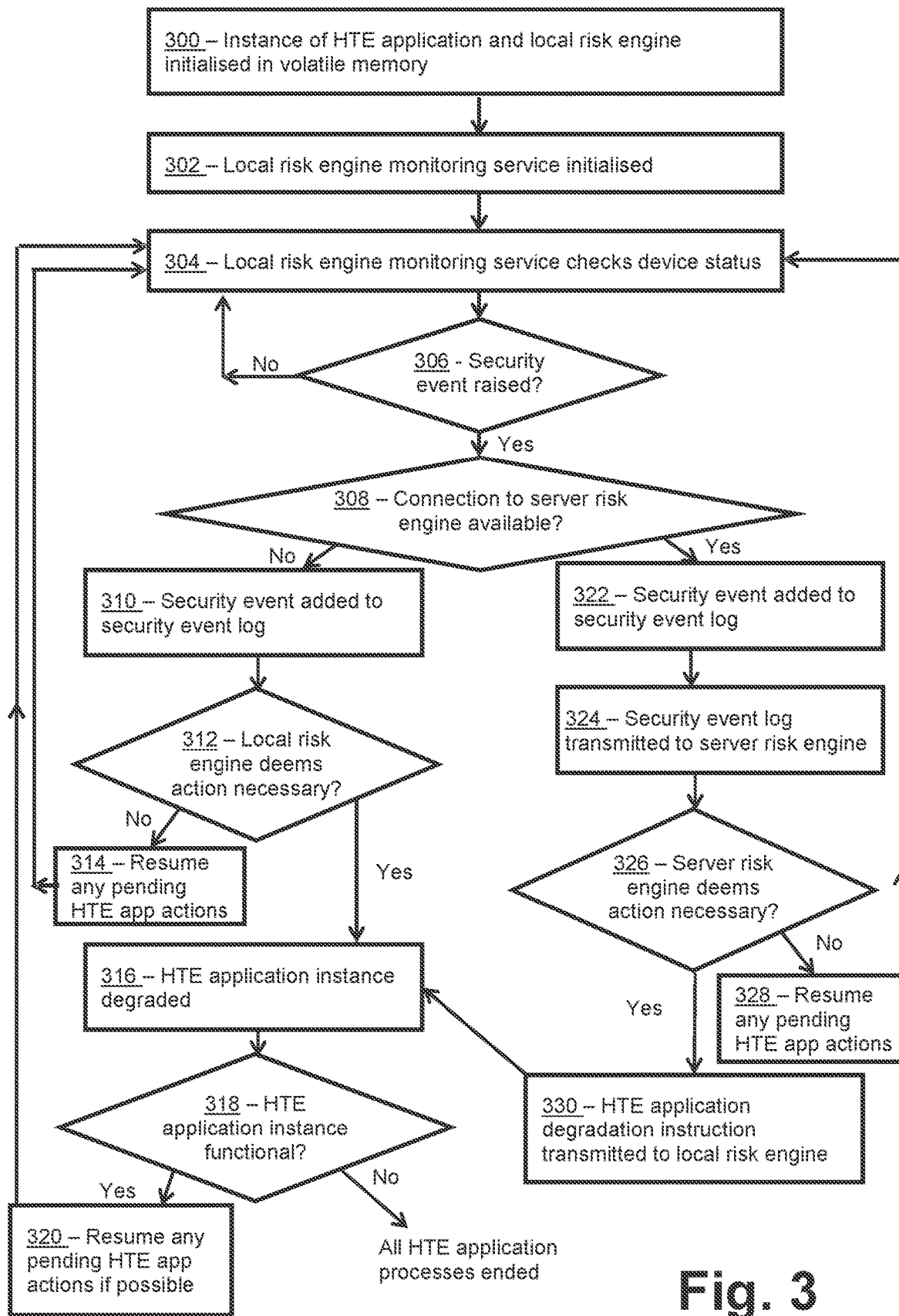
FIG. 3 is a flow diagram that shows a process for monitoring the security of an electronic device implementing the present invention.

FIG. 3 shows a flow diagram showing the handling of security events by local risk engine 212 and server risk engine 130.

As shown in box 300, an instance of HTE application 208 is initialised in volatile storage module 122. An instance of local risk engine 212 is also initialised in volatile storage module 122. This may be in response to a user interaction with user input module 116, e.g. selection of an HTE icon. Local risk engine 212 preferably runs as a background service such that it is executing even when HTE application 208 is not in the foreground. In this specification an application is understood to be 'in the foreground' when it is visible to the user (i.e. when it is active and has focus), and an application is understood to be 'in the background' when it is not visible to the user (i.e. when it is in a passive or inactive state and does not have focus). A background service is understood to be an application that runs invisibly to the user. A background service also runs regardless of which application currently has focus.

Following initialisation, in box 302 local risk engine 212 initialises a local risk engine monitoring service. This is also preferably a background service. This service may be separate from local risk engine 212 or it may be part of local risk engine 2121. In box 304 the local risk engine monitoring service checks the status of electronic device 104. In particular, the local risk engine monitoring service performs an initialisation check of electronic device. The initialisation check includes actions that seek to determine whether electronic device 104 is secure and whether HTE application 208 and local risk engine 212 are executing in a secure environment. The actions forming part of the initialisation check may be defined in an initialisation check configuration file that is included as part of local risk engine files 204. The initialisation check can involve any combination of the following:

Checking whether HTE application files 200 were obtained from a trusted repository such as the Google Play store;
Inspection of HTE application 208 verification data such as a digital signature;
Inspection of an HTE application 208 identifier such as a version name or number;
Comparison of checksums, hash values, etc. with expected values to verify the integrity of SCAD configuration files 202 and/or local risk engine files 204;
Checking the operating system name and/or version;
Determination of the identity of electronic device 104 (e.g. make, model, etc.);
Inspection of system files 206 for known security risks including evidence of malware, spyware, etc.;
Inspection of system files 206 for evidence that a modified operating system is being made use of; e.g. a 'rooted' Android operating system, or use of a modified operating system such as CyanogenMod;
Determination of whether electronic device 104 is operating in an online mode in which communication with data centre 106 is possible or an offline mode in which communication with data centre 106 is not possible;
Determination of whether the current version of HTE application 208 is the most up to date version; and
Inspection of currently active processes on electronic device 104 to check for known malware or spyware.

The initialisation check configuration file may include reference data for comparison with the results from the initialisation check. Alternatively this reference data may be stored in another file that is part of HTE application files 200. The reference data can include, for example, a list of all supported operating systems, a list of all supported electronic devices, a list of known malware and/or spyware applications, etc. The reference data can also include instructions that local risk engine 212 acts upon, such as an instruction to contact data centre 106 to request an identification of the latest available version of HTE application 208. The purpose of the reference data is to allow local risk engine 212 to perform checks to determine whether it needs to raise a security event. Accordingly, a skilled person having the benefit of this disclosure will readily identify other reference data suitable for this purpose.

The actions that are performed by local risk engine 212 as part of an initialisation check are not limited to the above examples and indeed need not comprise any of the above examples. The initialisation check comprises any actions that a skilled person deems useful in determining that HTE application files 200 have not been tampered with and/or that the HTE application has been installed on an electronic device that is running an operating system that is both supported and which has not been compromised in some way. The actions performed in the initialisation check may be modified by modifying the initialisation check configuration file. Further, it will be appreciated by the skilled person with the benefit of this disclosure that whilst the check may be an initialisation check, it is carried out just before a transaction takes place or before another high risk event but may be carried out constantly (eg. at regular intervals).

Following the initialisation check, the local risk engine monitoring service makes a decision in box 306 as to whether one or more security events should be raised. The raising of a security event is based on the results of the initialisation check and is governed by the rules in the local risk engine rule set. Referring to rule R1 from Table 1 as an exemplary local risk engine rule, if the initialisation check determines that the operating system of electronic device 104 is not on a list of supported operating systems contained within the reference data then rule R1 would trigger and cause the local risk engine monitoring service to raise a security event. The security event is a message that preferably contains information such as: an identification of the rule that caused the security event to be generated; information relating to the circumstances that caused the rule to trigger; a date and time at which the rule triggered; and/or an instruction for action to be taken in response to the rule being triggered. The security event may contain a data package that includes one or more files that are relevant to the rule; for example, a file that was identified as malware.

The purpose of the security event is to provide sufficient information for either local risk engine 212 or server risk engine 130 to decide what action should be taken (if any) in response to the security event having been raised. Accordingly, a skilled person having the benefit of the present disclosure will readily identify additional and/or alternative content for the security event. It is also contemplated that in some circumstances it may be beneficial to have more than one different type of security event, and/or to have multiple instructions within a single event such that different ones of the instructions may be enacted by different components of system 100.

Continuing the example of R1 from the first row of Table 1, a security event corresponding to this rule being triggered could take the following form:

---

Rule identification: R1
Rule trigger time: 03.02.2017 08:34:27
Trigger reason: OS version unsupported
Additional data: OS version = Android KitKat 4.4.2
Required action: Display user message "This OS version is unsupported"; close HTE application.

---

This form is merely exemplary and a skilled person having the benefit of the present disclosure will readily identify other suitable forms for a security event.

As shown in box 306 of FIG. 3, in the event that the results of the initialisation check do not cause any rules to trigger, no security events are raised. In this case the local risk engine monitoring service enters a periodic monitoring state (also box 304) in which it periodically performs a status check of the electronic device to determine whether anything has changed since the last check such that one or more security events should now be raised. The frequency at which the status check is to be performed is not critical to the working of the invention, but is regular in the sense that there are no gaps in the frequency to avoid an attack occurring whilst a monitoring is inactive. Preferably this frequency is selected such that it offers a good compromise between ensuring that changes to the electronic device environment are detected and reacted to quickly whilst also ensuring that the monitoring does not consume undue processing resources. For example, a status check may be performed once every second, or once every 0.5 seconds, or once every 0.1 seconds. Other check rates may alternatively be used. The actions that are to be performed as part of the periodic status check can be defined in a status check configuration file that is similar to the initialisation check configuration file.

In cases where the electronic device is operating in offline mode in which communication with data centre 106 is not possible, optionally the periodic status check includes checking whether the electronic device has now switched to operation in an online mode in which communication with data centre 106 is possible. In the case where online mode is detected, the periodic check optionally further includes determining whether there are any security events in a security log (see later discussion in respect of box 310) that have not yet been sent to server risk engine 130. If any unsent security events are found, then preferably the periodic status check includes sending the security event log to server risk engine 130. This ensures that the server risk engine is kept informed of the status of electronic device 104. As the server risk engine rule set typically differs from the local risk engine rule set, given the same set of facts, server risk engine 130 may raise a security event that would not be raised by local risk engine 212. Server risk engine 130 may thus be described as supplemental to local risk engine 212.

In addition to performing periodic status checks, the local risk engine monitoring service is also configured to continuously listen for messages from server risk engine 130. A message from server risk engine 130 may be received at any time whilst electronic device 104 is online. A message from server risk engine 130 may be acted upon by local risk engine 212 and/or HTE application 208. A message from server risk engine 130 may contain instructions for the HTE application 208 to process. For example, the server risk engine 130 can instruct the HTE application 208 to close itself, or to reduce the level of functionality available to the user, etc.

In the event that one or more security events are raised, the local risk engine 212 determines in box 308 whether a connection is available to server risk engine 130.

In the event that a connection is not available, such as when electronic device 104 is operating in an offline mode, in box 310 local risk engine 212 adds the one or more security events to a security event log. The security event log is a file that is stored on non-volatile storage module 120 and which comprises details of security events that are raised by the local risk engine monitoring service. Each entry in the security event log includes the security event itself and may also include other information deemed useful by a skilled person, such as e.g. information relating to the status of electronic device 104 at the time the event occurred, information relating to the HTE application such as version number etc., information relating to the electronic device such as make and/or model, operating system version, etc. Any other information that is deemed useful by a skilled person can be additionally or alternatively included in the security event log. The security event log may be encrypted, preferably using a public key of an asymmetric key pair where the private key is known only to data centre 106 (e.g. stored in HSM 134). As explained above, preferably the security event log is transmitted to server risk engine 130 as soon as electronic device 104 switches to an online mode.

The security event can also include information from sensors that are part of electronic device 104, including but not limited to a location of the device as provided by a GPS sensor and/or WiFi antenna, historical information relating to the motion of the electronic device as provided by integrated accelerometers, historical information relating to the ambient noise picked up by an integrated microphone, historical information relating to light levels and/or images detected by an integrated camera, etc. This information may be used by local risk engine 212 and/or server risk engine 130 to assess the security status of the electronic device. One or more rules may be written that make use of this information. For example, a rule may specify that action should be taken if GPS data shows that electronic device 104 is located outside of a country in which the currently logged on user is resident. Preferably, any such sensor data is encrypted and stored only for such time as it is useful, after which time the sensor data is preferably deleted.

In box 312 local risk engine 212 determines whether it deems that action is necessary in view of the one or more security events that it has logged. This determination is made by examination of the security event(s) to determine whether an instruction to take action is present. In the case that no action is required, in box 314 local risk engine 212 instructs HTE application 208 to resume any pending HTE application actions that it may have been carrying out before the security event was raised. For example, if the HTE application was in the process of provisioning SCAD 210, or in the process of taking a payment, then in box 314 the HTE application would resume this process.

However, if local risk engine 212 deems that action is necessary, then in box 316 the local risk engine degrades the functionality of HTE application 208 in some way. As used here, 'degrading the functionality' means taking some action that causes the functionality of HTE application 208 that is available to the user to decrease. This includes actions such as: invalidating the currently active session such that the user has to provide their logon credentials to the HTE application again in order to continue using it; allowing the user to review previous transactions but preventing the user from taking further payments; closing the HTE application; and/or invalidating an existing SCAD instance. This is not an exhaustive list of actions and a skilled person having the benefit of the present disclosure will readily identify additional and/or alternative suitable actions for degrading the functionality of HTE application 208. It will be appreciated that multiple actions can be taken—for example, the HTE application may be closed and a SCAD instance may be invalidated. A message may be displayed to a user indicating that the HTE application functionality has been degraded. The message may contain information on steps that the user can take in order to reinstate full functionality of the HTE application.

In box 318 the HTE application determines whether it is capable of offering any useful functionality to the user in its degraded state. For example, if the degradation of functionality involved requiring the user to re-enter their logon credentials, then the HTE application will remain available for the user. As another example, if the HTE application switches to a mode in which previous transactions can be reviewed by no further payments can be taken, it will still remain available to the user as the payment reviewing functionality may still be of use to the user.

In the case that the HTE application still offers some useful functionality, then in box 320 the HTE application attempts to resume any pending HTE applications if possible. An action is possible to resume if it is within the scope of the reduced functionality of the HTE application. For example, in the case where the degradation involves preventing the user from carrying out new transactions, and where a user was reviewing a previous transaction when the security event was raised, HTE application 208 will allow the user to continue reviewing this previous transaction as it is within the reduced functionality of the HTE application. However, in the case where the user was in the process of taking a payment, the HTE application would not be able to continue this process and so, whilst the HTE application would remain available for the user to access on their electronic device, the payment taking process itself would be terminated. In such cases HTE application 208 may display a message to the user indicating that an ongoing HTE application action could not be completed.

It will be appreciated that in cases where degrading the functionality of the HTE application includes closing the HTE application, box 318 is skipped and the process goes directly from box 316 to the end result of all HTE application processes being ended. A log file may be created and stored on non-volatile storage module 120 indicating the cause of the closure. The log file may be transmitted to data centre 106 before the HTE application closes. The log file may be encrypted.

Returning now to box 308, in the event that a connection to server risk engine 130 is available (i.e. electronic device 104 is working in online mode), then the process moves to box 322 in which the detected security event(s) are added to the security event log. This process is as described in relation to box 310. However, in contrast to offline mode, in online mode the process then moves to box 324 in which the security event log is transmitted to server risk engine 130. Preferably the security event log is encrypted before transmission, possibly using a public key of an asymmetric key pair where the corresponding private key is known to data centre 106, e.g. stored in HSM 134. In the case that the security event log is encrypted, server risk engine 130 decrypts the security event log, possibly using a key provided by HSM 134.

In box 326 the server risk engine determines whether any action is necessary in view of the security event(s) contained in the security event log. This determination is made by examination of the security event(s) to determine whether an instruction to take action is present; i.e., in the same way as described earlier in connection with the determination made by the local risk engine in box 312. The difference here is twofold: firstly, the server risk engine rule set is not necessarily the same as the local risk engine rule set; and secondly, the information available to the server risk engine is more wide reaching than the information available to local risk engine 212. Specifically, local risk engine 212 typically only has access to information relating to electronic device 104, whereas server risk engine 130 has access to information from a large number of devices and also other external sources. This means that the server risk engine rule set can contain 'bigger picture' type rules; for example, rules relating to particular geographical regions, or particular types of electronic device. The server risk engine rule set may contain one or more of the same rules as contained in the local risk engine rule set, but typically the server risk engine rule set contains more rules than the local risk engine rule set. For this reason it is preferable that server risk engine 130 makes a determination as to whether to raise a security event rather than local risk engine 212, where possible, since the server risk engine is typically 'better informed' than the local risk engine. Thus it is preferred that in online mode local risk engine defers a security assessment to server risk engine. The server risk engine 326 may include a machine learning component, e.g. an artificial neural network, that allows the server risk engine rule set to be dynamically changed over time so as to take account of both micro-scale and macro-scale changes.

In box 326 the server risk engine determines whether any action is necessary in view of the security events in the transmitted security log. The determination by the server risk engine is performed by examination of the security event(s) to determine whether an instruction to take action is present. As part of this activity, the server risk engine may request one or more pieces of information from HTE application 208 to allow the server risk engine to complete the assessment of whether action is required. This information could include, for example, any combination of electronic device sensor data (e.g. accelerometer data, barometer data, location data, etc.), operating system version, HTE application version, a list of processes currently executing on the electronic device, etc.

In the event that no action is deemed necessary then in box 328 the server risk engine instructs HTE application 208 to resume any pending HTE application actions (see box 314 and related description). In addition to any resumed actions, the HTE application 208 also returns to the periodic monitoring state as described above in connection with box 304.

In the event that action is deemed necessary by the server risk engine then the process moves to box 330 in which the server risk engine transmits an HTE application degradation instruction to the HTE application. The HTE application degradation instruction specifies a level of functionality that the HTE application should offer, up to and including an instruction that the HTE application should close and possibly also render any SCAD instance unusable. This instruction is acted upon by the local risk engine to cause degradation of the HTE application instance as described earlier in connection with box 316. The process then continues as described earlier in connection with boxes 318 and 320.

It is possible that at any time during the process of FIG. 3 electronic device 104 could switch from online mode to offline mode in which contact with data centre 106 is no longer possible. This switch between modes is referred to in this specification as a 'disconnect'. To deal with the situation where a disconnect occurs when local risk engine 212 is waiting for instructions from server risk engine 130, it is preferable that the local risk engine 212 operates such that it will revert to processing of security events in an offline manner (i.e. boxes 310 to 320) as soon as it becomes aware of the disconnect. It is also possible to have a set of local rules may carry out this functionality. For example, local risk engine 212 may wait for instructions from server risk engine 130 for a set time, and if no instructions are received within that time, it may revert to offline processing of security events.

As is shown in FIG. 3, in either offline or online mode, if HTE application 208 remains available to the user then the process returns to the periodic monitoring of electronic device 104 as explained in connection with box 304. It is thus possible for a further security event to be raised, at which point the process explained in connection with boxes 308 to 330 is again followed.

Figure 4A:
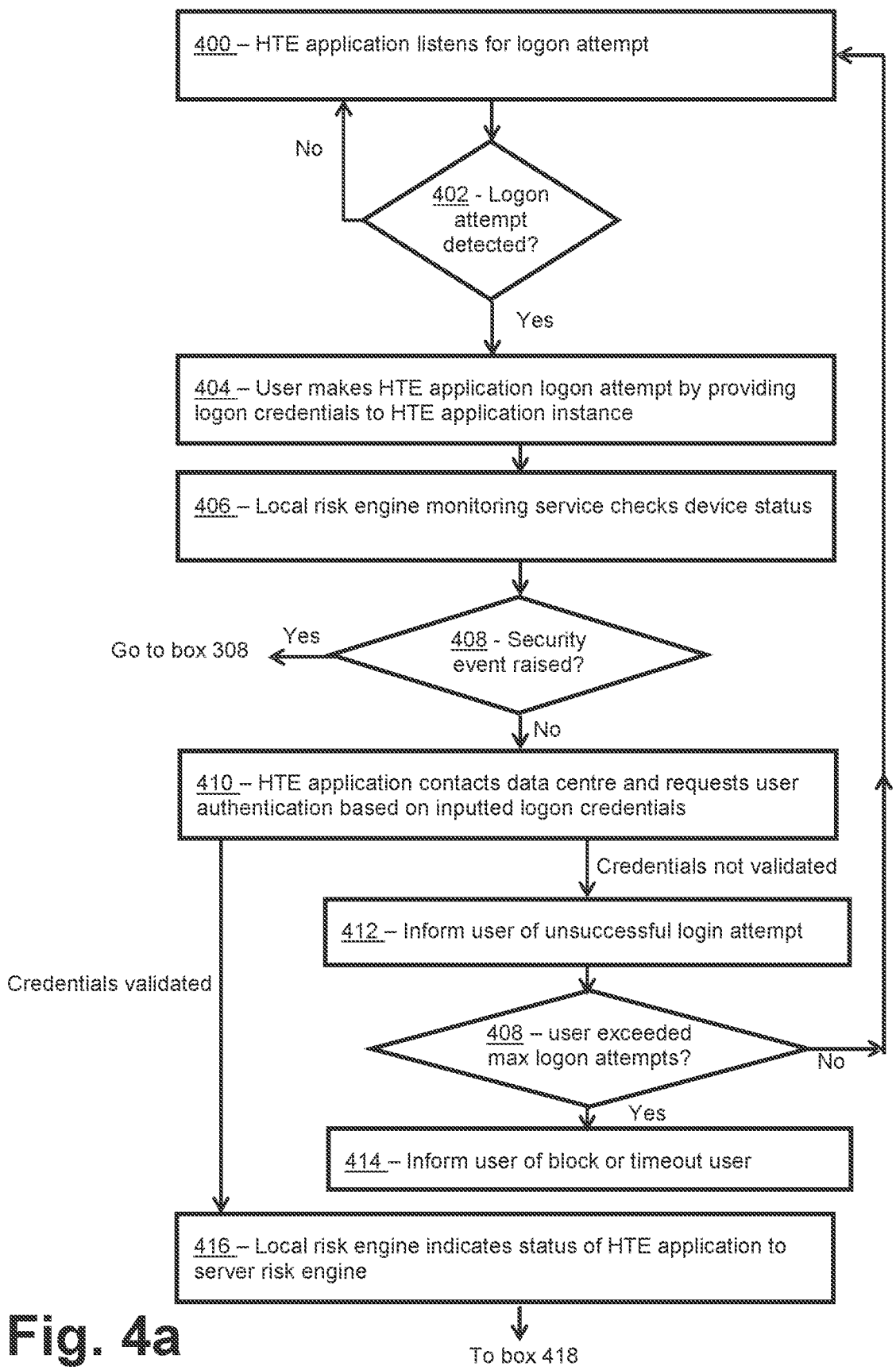
FIGS. 4a and 4b are flow diagrams showing a device-side process for logging on to a Host Terminal Emulation (HTE) application to configure the HTE application for taking electronic payments.
Figure 4B:
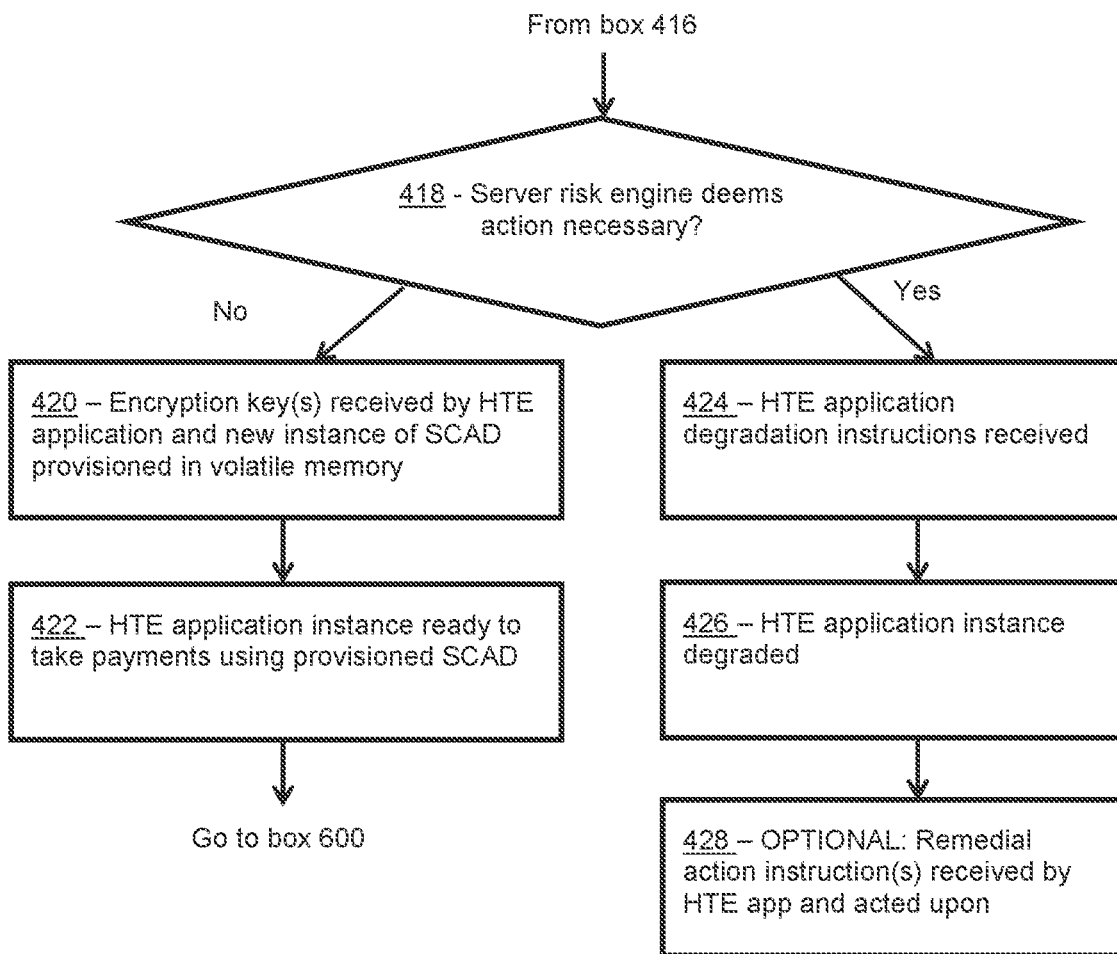

Referring now to FIGS. 4a and 4b, the process by which a user can logon to HTE application 208 is described. The logon process links a particular user (e.g. an employee of a merchant) to a particular HTE application instance and corresponding SCAD instance. It is important to appreciate that a SCAD 210 is only able to take payments after a user has successfully logged on to HTE application 208. Without a successful logon, SCAD 210 does not possess the encryption key(s) that are required to communicate successfully with data centre 106 in order to take a payment. This advantageously means that a third party cannot obtain confidential and/or secure data such as the encryption key(s) used in payment transactions from an instance of HTE application 208 in which a user has not logged on. Users will preferably be required to pre-register themselves before being able to logon to HTE application 208. The pre-registration may include a security check of the user. The pre-registration may associate the user with a particular merchant account such that transactions performed by that user will be directed to the linked merchant account. Multiple users can be linked to a single merchant account, but each individual user has their own unique logon credentials.

In box 400, HTE application 208 listens for a logon attempt and in box 402 the HTE application determines whether a logon attempt was detected. The logon attempt typically comprises the user initialising HTE application 208, or bringing an already initialised instance of the HTE application to the foreground, and selecting a GUI element of the HTE application using user input module 116. For example, the user may select a GUI button that reads 'Press here to log on'.

It will be appreciated that the process of FIG. 3 can be carried out one or more times before the HTE application 208 begins listening for a logon attempt and also that this process can be carried out periodically during the time that the HTE application listens for a logon attempt. Preferably, HTE application 208 does not allow a logon attempt to be made before the process of FIG. 3 has been carried out at least once. In the event that an instance of the HTE application is already initialised, boxes 300 and 302 of FIG. 3 are omitted and the process begins at box 304.

In box 404 the user make an HTE application logon attempt by providing logon credentials to HTE application 208 via user input module 116. The logon credentials can comprise any authentication credentials known in the art, including but not limited to a username and password, a biometric password such as a fingerprint or iris scan, etc. A two factor authorisation may be required where the user is required to input two pieces of information known only to them (e.g. a password and biometric password or physical token).

In box 406 the local risk engine monitoring service checks the status of electronic device 104. This check is performed in the same way as described in connection with box 304 of FIG. 3. In box 408 local risk engine 212 determines whether to raise one or more security events in the manner described in connection with box 306. If a security event is raised then the logon action is interrupted and the process moves to box 308 to investigate whether action is necessary. In the event no action is necessary then the logon process resumes and proceeds to box 410. In the event action in response to the security event(s) is necessary then, once such action has been taken, HTE application 208 will attempt to resume the logon process. However, if the functionality of HTE application 208 has been degraded to a level that means that logon processing is no longer possible then the logon process is terminated. Preferably in that situation a message is displayed to the user indicating that the logon process has been terminated. This may not be possible; e.g. if HTE application 208 has been closed in response to the security event(s) that were raised.

In the case that the HTE application is able to continue with the logon process, in box 410 the HTE application attempts to contact data centre 106 to request authentication of the credentials that were inputted by the user. It will be appreciated that, if electronic device 104 is operating in an offline mode, a connection with data centre 106 will not be available. In that case HTE application 208 terminates the logon procedure and preferably displays a message to the user indicating that the logon process has been terminated due to lack of an available network connection. Preferably the HTE application provides information indicating its version and/or the operating system that it is running on as part of the authentication request to enable data centre 106 to determine whether the HTE application is the most up to date version and to check whether the operating system is trustworthy. In another implementation the HTE application can retain the logon token from the identity asserter in non-volatile memory and present this once it connects again for validation. This is common in web applications and has the advantage of retaining the logon session for as long as the logon token is valid with the server identity asserter. In this case the application can have reduced functionality, for example, only record new cash transactions and view transaction history until the connection is back online, when a new higher risk payment transaction can then take place (but first the validation checks would take place again and the server and local risk engines must be happy that everything is secure).

In the case that the electronic device is working in an online mode, then a connection with data centre 106 is established in the usual manner known in the art. Preferably the connection is an encrypted connection that makes use of some form of Transport Layer Security (TLS) or equivalent. Establishing a connection using TLS or an equivalent is well known in the art and is thus not discussed in detail here. Once the connection is established, HTE application 208 requests authentication of the user by transmitting an authentication request that includes the user credentials to data centre 106. Preferably HTE application 208 also transmits any security event log entries that have not already been transmitted to server risk engine 130 with the authentication request. The security event log entries may include details of security events and/or other information relating to electronic device 104.

Data centre 106, and in particular server identity module 136, processes the authentication request in the manner described later in connection with FIG. 5 and provides a response to HTE application 208. The response from server identity module 136 indicates whether the supplied user credentials were validated. In the case where the credentials were not validated the process continues to box 412 in which the user is informed that their logon attempt was unsuccessful due to the credentials they supplied not being validated. Preferably the response from data centre 106 also indicates whether the user has exceeded an allowed maximum number of consecutive failed logon attempts. In the event that the user has not exceeded this maximum then the process returns to box 400 and the HTE application listens for the user to make another logon attempt. The number of failed logon attempts is preferably reset to zero once a successful logon attempt is made by the user.

However, if the user has exceeded a maximum number of consecutive failed logon attempts then the process moves to block 414 where HTE application 208 informs the user that they have been blocked or timed out. A blocked user has their access suspended and they may need to contact a trusted party via an out of band means, e.g. by telephone, to have their account unblocked. Alternatively a user may be timed out such that any logon attempt made by that user over some specified time period (e.g. the next 10 minutes, 1 hour, 1 day) is refused even if the correct user credentials are supplied. Any other actions that are deemed appropriate by the skilled person may alternatively or additionally be taken in response to the user exceeding the maximum number of allowed consecutive failed logon attempts. It should be appreciated that, in the case of a blocked or timeout user, HTE application 208 is still available for use by another, different user.

In the case where data centre 106 indicates that the supplied logon credentials were validated then the process moves to box 416 in which local risk engine 212 indicates the status of HTE application 208 to server risk engine 130. Indicating the status may include transmitting any outstanding security event log entries to server risk engine 130, or transmitting a message indicating that no outstanding security events log entries exist. Indicating the status may additionally or alternatively include transmitting one or more pieces of information relating to HTE application files 200, system files 206, HTE application 208, operating system 214, or any other information relating to electronic device 104 including e.g. the device make and model and/or sensor data such as location, historical data showing the movements of the device, etc. Any information deemed useful by a skilled person having the benefit of the present disclosure for determining whether electronic device 104 is secure can be included in the status message that is transmitted to the server risk engine.

Upon receipt of the status message the server risk engine determines in box 418 whether any action is deemed necessary. This determination is described later in connection with FIG. 5. HTE application 208 receives a reply from server risk engine 212 indicating whether or not server risk engine deems it necessary to take action. In the case where no action is deemed necessary, the process moves to box 420 where one or more encryption keys are received by the HTE application from data centre 106 and in particular HSM 134 via payment switch 132. The received encryption key(s) are provisioned in a new instance of a SCAD 210 that is created by the HTE application 208 for this purpose. The SCAD 210 is created based on information obtained from SCAD configuration files 202. SCAD 210 exists only in volatile storage module 122 so that the received encryption key(s) are never stored on non-volatile storage module 120. It is only at this point that the now provisioned SCAD 210 is able to take payments, per box 422. It will be appreciated that at this point the electronic device is able to act as a payment terminal because it contains within SCAD 210 the necessary encryption key(s) to make electronic payments. In this way the electronic device should be distinguished from a 'virtual terminal' or 'hosted payment page', which provides a web-based interface that accepts payment details and routes these details onward for further processing. Critically, in this case the electronic device that enables the user to access the web-based interface (i.e. the electronic device executing the web browser) is not itself a payment terminal.

The encryption key(s) received from HSM 134 may be generated by any key generation method known to the skilled person. Symmetric key encryption standards such as Advanced Encryption Standard (AES) may be used; alternatively, asymmetric encryption standards such as RSA may be used. A combination of asymmetric and symmetric encryption standards may also be used—for example, RSA can be used to encrypt and securely transmit a symmetric key from HSM 134 to SCAD 210, allowing SCAD 210 to decrypt the symmetric key and to use the symmetric key in future communications with data centre 106. A key management algorithm such as DUKPT may be used to generate one-time keys from the symmetric key. Preferably all encryption keys are generated in a robust manner using random numbers and/or other seed data such as a device identifier and/or user credentials.

Following provisioning of the SCAD, the HTE application listens for a payment transaction to be initiated, as described below in connection with FIGS. 6a and 6b.

In the event that server risk engine 130 determines in box 418 that action is necessary then the process moves to box 424 where HTE application 208 receives HTE application degradation instructions. These instructions are processed by HTE application 426 in order to degrade the functionality of the HTE application. This is as described in connection with boxes 330 and 316 of FIG. 3, respectively. In this case no encryption key(s) are transmitted and hence there is no instance of a provisioned SCAD on electronic device 104. This procedure prevents the encryption key(s) being transmitted to an electronic device that cannot be verified as secure.

Optionally, HTE application 208 may receive one or more remedial action instruction(s) from data centre 106. The remedial action instructions specify actions that can be taken by HTE application 208 in order to rectify the degradation of functionality. For example, the remedial action instructions may include a message that is to be displayed to the user, e.g. 'Payment transactions cannot be made using this device at this time. Please contact a help desk on <telephone number> to rectify this'. The remedial action instructions may additionally or alternatively include instructions for the HTE application 208 to process, such as to download and install a more recent version of HTE application files 200 and/or to update one or more rules in the local risk engine rule set. These remedial actions are purely exemplary and other actions that seek to restore the HTE application to increased or full functionality may additionally or alternatively be included as part of the remedial action instructions.

It will be appreciated the order of boxes 410-414 and boxes 416-418 can be switched. Specifically, HTE application 208 can indicate its status to server risk engine before requesting user authentication. More generally, it will be appreciated that the security checking process described in connection with FIG. 3 can be performed as many times and at as many points in the logon process as deemed appropriate by a skilled person having the benefit of the present disclosure.

Figure 5:
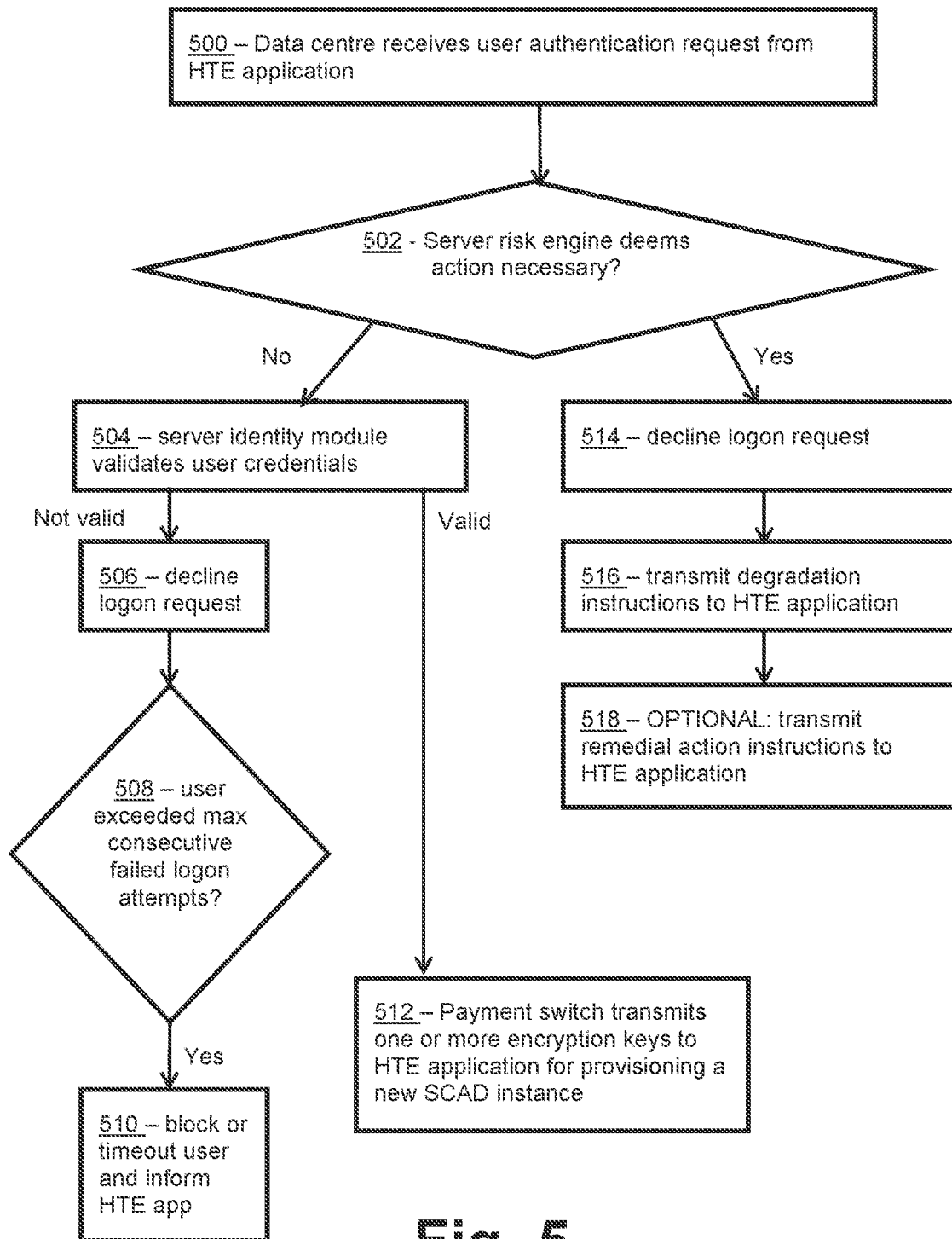
FIG. 5 is a flow diagram showing a server-side process for logging onto a HTE application to configure the HTE application for taking electronic payments.

FIG. 5 shows the process by which data centre 106 authenticates a user logon. This process is complimentary to the process shown in FIGS. 4a and 4b in which HTE application 208 requests user logon authentication.

In box 500 the data centre receives a user authentication request from HTE application 208. The user authentication request is of the type transmitted in accordance with the process of box 410 of FIG. 4. The user authentication request is initially routed by the channel router to server risk engine 130, which in box 502 determines whether any action is deemed necessary from a security perspective. This determination is performed in the manner described earlier in connection with box 326.

In the event that no action is deemed necessary by server risk engine 130, then the process moves to box 504 in which the server identity module 136 validates the user credentials that were included in the authentication request. If supplied in an encrypted form, the user credentials are first decrypted before validation. As is known in the art, validation involves comparing the (decrypted) user credentials with corresponding user credentials that are stored in a database (not shown) that is accessible to server identity module 136. If the supplied credentials match the credentials stored in the database then the user's identity is confirmed and if the supplied credentials do not match the credentials stored in the database then the user's identity is not confirmed. The user credentials being transmitted and in the database may be protected using cryptographic techniques such as hashing and/or salt values as is known in the art of cryptography. The credentials stored in the database are obtained via a separate registration process that is carried out before HTE application 208 can be used. Preferably, the registration process involves security checks to maximise the chance that a user attempting to enroll for the service is trustworthy.

In the event the supplied user credentials are not validated, the process moves to box 506 in which server identity module 136 declines the logon request and transmits a logon denied message to HTE application 208. Server identity module 136 may also determine in box 508 whether the user has exceeded the maximum number of allowed consecutive failures for logon attempts. In the case that the user has exceeded this maximum, in box 510 server identity module 136 puts a block or timeout on the account associated with the user that made the logon attempt. Preferably server identity module 136 also transmits a message to HTE application 208 indicating that a block or timeout has been put in place; this information may be transmitted in the logon denied message, or via a separate message.

In the event that the supplied user credentials are validated, the process moves instead to box 512 where payment switch 132 transmits one or more encryption keys to the HTE application 208 for provisioning a new SCAD instance 210 in volatile storage module 122. As mentioned earlier in this specification, it is only once SCAD 210 has been provisioned with encryption key(s) that it can take payments. It will be appreciated by a skilled person having the benefit of the present disclosure that the encryption key(s) provided to SCAD 210 are associated with and unique to the user credentials supplied to server identity module 136. In this manner the invention creates an application-based payment terminal that is linked to a particular user, and preferably a user that is deemed trustworthy during enrolment.

Limits may be placed on users according to a number of factors. For example, a user's payment taking history may be taken into account, so that a SCAD that is provisioned based on credentials supplied by a newly enrolled user may be restricted to taking only a certain total value of payments in a predefined time period; e.g. £500 per day. Limits may also be placed on users according to other factors including but not limited to their geographical location, the time for which they have been enrolled to the HTE application service, the average number of transactions that the user takes per day, whether the user is associated with a merchant, and/or the type of merchant that the user is associated with. Other such limits will be readily determined by a skilled person having the benefit of the present disclosure.

Returning to the decision of box 502, if the server risk engine deems that action is necessary then in box 514 the logon request is declined by server identity module 136. It should be appreciated that in this circumstance the logon request is declined regardless of whether the supplied user credentials are valid or not. Preferably a message is transmitted to HTE application 208 indicating that the logon request was declined. Following this, in box 516 one or more functionality degradation instructions may be transmitted to HTE application 208 from the server risk engine and optionally in box 518 one or more remedial action instructions may also be transmitted to HTE application 208 from the server risk engine. This process is as described in connection with boxes 330 and 316. It will be appreciated that, in the event server risk engine 130 considers action necessary, no provisioned SCAD instance is generated on electronic device 104. This advantageously prevents the encryption key(s) from being transmitted to a device that is untrustworthy.

Figure 6A:
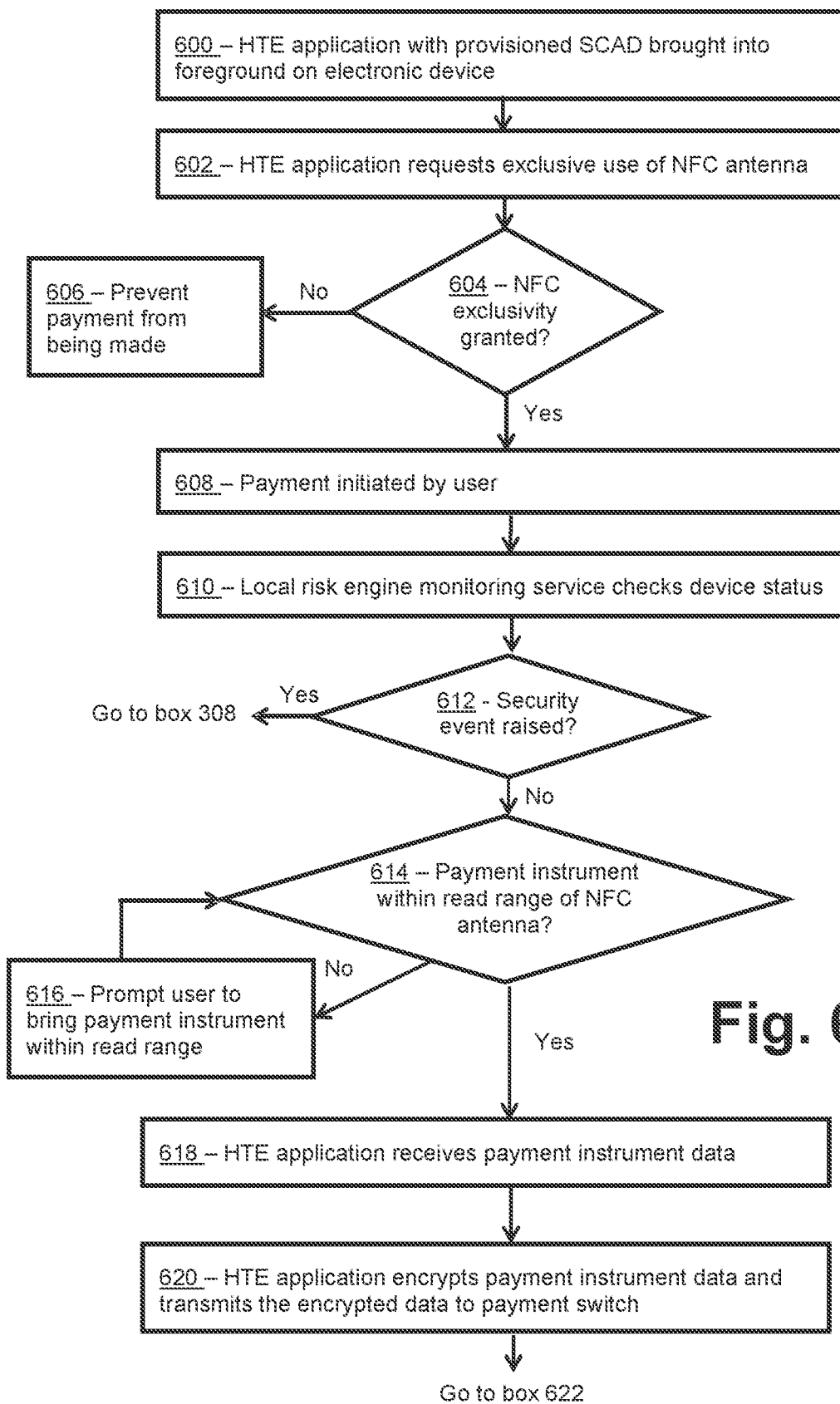
FIGS. 6a and 6b are flow diagrams showing a device-side process for taking an electronic payment using an electronic device implementing the present invention.
Figure 6B:
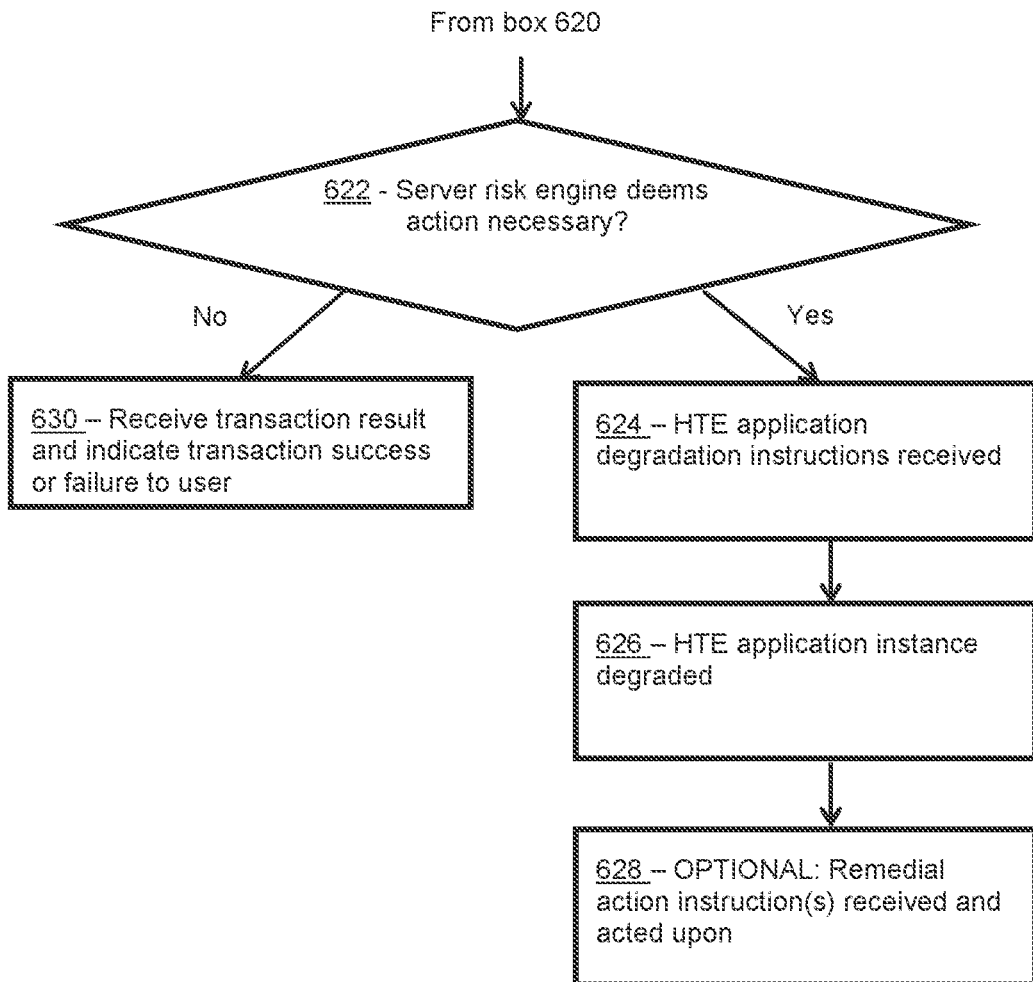

FIGS. 6a and 6b show the process by which a provisioned SCAD can take an electronic payment such that electronic device 104 acts as a payment terminal. In box 600 an instance of HTE application 208 that has a provisioned SCAD associated with it is brought into the foreground on electronic device 104, indicating that a user intends to make an electronic payment. Upon being brought into the foreground, in box 602 the HTE application requests exclusive use of NFC antenna 126. This request is made to operating system 214 a manner well known in the art. Here, 'exclusive use' means that no other application is able to access NFC antenna 126 to send, receive and/or view data whilst the antenna is being used by HTE application 208. This prevents another application from intercepting sensitive data such as cardholder information which is intended to be routed to HTE application 208. Preferably data received by NFC antenna 126 is processed in a TEE as described earlier in this specification to reduce the risk of plain text cardholder details being siphoned off by an attacker. In this case the TEE and NFC could be connected in a way that prevents eaves dropping from the operating system which can improve the security of transmission of card details.

Following this request, in box 604 HTE application 208 checks to see whether or not it obtained exclusive access of NFC antenna 126. In the case that exclusive access is not granted to HTE application 208, in box 606 the HTE application 208 takes action to prevent any payment from being taken. This action may include displaying a notification to the user indicating that the NFC antenna is in use such that payments cannot be taken. The user may additionally or alternatively be prompted to close any other open applications that could be making use of the NFC antenna and to try initiating the payment process again. The user may also be warned against a payment instrument being moved into NFC read proximity of NFC antenna 126 via a visual warning or similar on display 118.

In the case that HTE application 208 is granted exclusive access, then the process moves on to step 608 where a payment is initiated by the user. Payment initialisation may involve entering one or more payment details such as a payment amount via user input module 116. The user may indicate that a payment is ready to be taken by pressing an 'enter' or 'pay now' GUI button, or similar. This action causes HTE application 208 to begin the payment taking process.

Figure 9:
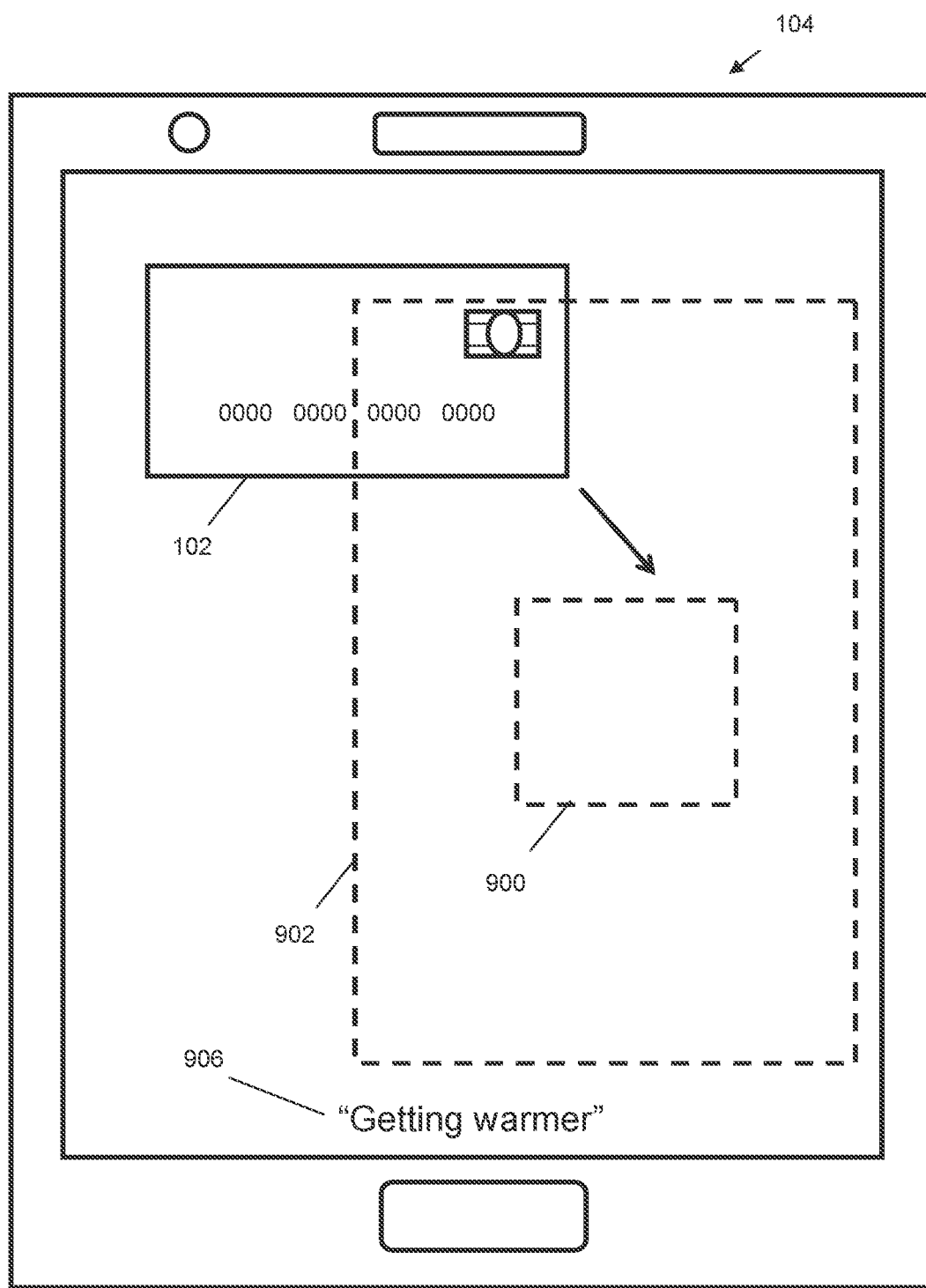
FIG. 9 is a diagram showing a second mechanism for assisting a cardholder in the placement of their payment instrument with respect to an NFC antenna of an electronic device.

As shown in boxes 610 and 612, before taking a payment the local risk engine monitoring service first checks the device status and determines whether any security events are to be raised. The procedure that is followed is the same as that described earlier in connection with boxes 304 and 306. In the case that a security event is raised, the process moves to box 308 of FIG. 3 to handle the processing of the security event. In the case that a security event is not raised, the process moves to box 614 where HTE application 208 determines whether the NFC antenna 109 of payment instrument 102 is in read range of NFC antenna 126. Here, 'read range' means that it is possible for the NFC antenna to unambiguously read data stored on the payment instrument. The region in which a successful data transfer can occur may be referred to as the 'read zone'. This should be distinguished from the case where the payment instrument is close enough to NFC antenna 126 to be detected but sufficiently far away that data transfer is either unreliable or not possible. This latter situation is referred to being with 'detection range' in this specification, and the region in which the payment instrument is detectable but for which data cannot be reliably transferred is referred to the 'detection zone'. It will be appreciated that the read zone is located within the detection zone. FIG. 9 provides an illustrative example of this arrangement.

Figure 8:
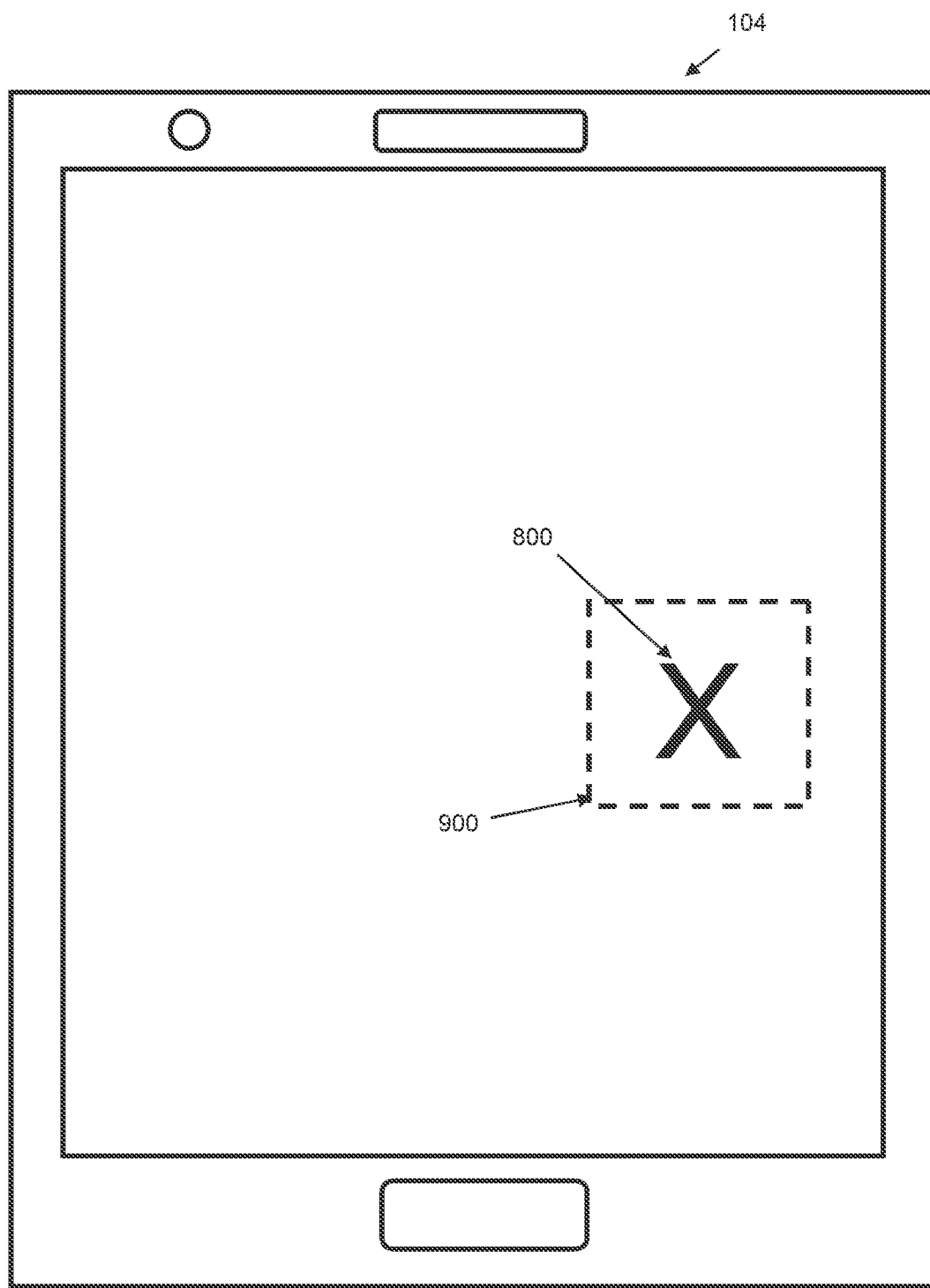
FIG. 8 is a diagram showing a first mechanism for assisting a cardholder in the placement of their payment instrument with respect to an NFC antenna of an electronic device.

Preferably HTE application 208 provides a GUI element on display 118 that assists the cardholder in correctly locating the payment instrument with respect to NFC antenna 126. Here, a cardholder is a second user that is the owner of payment instrument 102. It is desirable to direct the cardholder to correct locate their payment instrument because each NFC antenna 126 does not have a common location with respect to electronic devices of differing types, makes and models. In the case of smartphones and tablets in particular it is typically the case that NFC antenna 126 produces a significantly weaker signal than is usually produced by a prior art payment terminal (e.g. a Pin Entry Device). Either one of these factors or a combination of these two factors can mean that, without guidance, a cardholder (or merchant) can spend a non-trivial amount of time attempting to bring their payment instrument into read range of NFC antenna 126. FIGS. 8 and 9 of this specification provide examples of GUI elements that can be made use of to assist the user in quickly and easily finding the 'sweet spot' location at which their payment instrument can be read.

The process loops through boxes 614 and 616 until the payment instrument is brought into read range. The process may time out after some set time period in which no read event occurs, and a suitable message such as "Do you wish to continue with this transaction?" may be displayed on display 118.

Once a payment instrument is detected in read range, the process continues to box 618 where NFC antenna 126 receives payment instrument data from NFC antenna 109. The payment instrument data is routed by NFC controller 124 to the HTE application 208, preferably via a TEE. The payment instrument data can include any combination of a cardholder name, a unique identifier such as a Permanent Account Number (PAN), a card expiry date, and/or a cryptogram corresponding to the payment instrument. Other data known to the skilled person may alternatively or additionally be received by NFC antenna 126.

Once the HTE application has received the payment instrument data, in box 620 the HTE application encrypts the payment instrument data and transmits the encrypted payment instrument data to payment switch 132. The payment instrument data is encrypted either using an encryption key that is stored in the provisioned SCAD 210, or using an encryption key derived from a base key that is stored in the provisioned SCAD 210. In the case where the encryption key is a derived key, a key derivation method such as Derived Unique Key Per Transaction (DUKPT) may be used. Alternative key management schemes known to a skilled person may be used instead of DUKPT.

As noted earlier in this specification, a provisioned SCAD is required to perform the encryption of the payment instrument data. Thus, a payment cannot be taken without a provisioned SCAD. It is only possible to obtain a provisioned SCAD via successful login to HTE application 208. As SCAD 210 is stored in volatile storage module 122 only, and both the local and server risk engines continually monitor SCAD 210 for signs of tampering, it is evident that the present invention provides a secure application-based payment terminal. Additionally, a given instance of the application-based payment terminal can be readily protected by revoking a provisioned SCAD such that it no longer contains a valid encryption key. A provisioned SCAD can be revoked on the instruction of either the local risk engine or the server risk engine. As the SCAD resides in volatile memory only, it will not survive electronic device 104 being powered down; nor will the SCAD survive the memory it resides in being re-used by the operating system for a different application.

The transient nature of SCAD 210 is advantageous in this application because it makes it very difficult if not impossible to extract encryption key(s) from SCAD 210. It also makes it very easy for a compromised SCAD to be disabled. Additionally, if desirable, a new version of the HTE application can be issued and each electronic device can be required to download and install the updated version before any further payments can be taken. Preferably a new version of the HTE application is issued periodically (e.g. every 3 months) where this new version makes use of code obfuscation and protection techniques that are different to those of the previous version. Base or master encryption keys may also be periodically changed. This means that a particular exploit or hack that worked for one version of the HTE application will be very unlikely to work for another version of the HTE application. It will also disrupt attempts to reverse engineer the HTE application. Since all that is required to implement this change is a download of HTE application files, it can be seen that the present invention provides a means for quickly and easily removing compromised payment terminals from circulation and replacing these compromised payment terminals with secure payment terminals.

It will also be appreciated that an advantage of the application-based terminals described herein is that they can be created 'on the fly' by transmission of encryption keys to an appropriately located electronic device. Prior art hardware-based terminals have to be physically delivered to their site of use and then manually configured at this site. The problems that have been overcome by the present invention may thus include ensuring that the application-based terminal is secure, because it is not possible to rely on traditional techniques such as use of secure elements or other such secure hardware when providing an application-based terminal. The invention may thus be said to solve the technical problem of providing a secure terminal using unsecured hardware. The invention is however not limited to solving this particular problem and additional or alternative problems solved by this invention may be identified.

Preferably, a given instance of a provisioned SCAD remains valid for a predetermined time period, after which it is revoked. The predetermined time period is preferably chosen such that it is not so short that it inconveniences the user by requiring them to log on excessively often, but not so long that the security of the SCAD is significantly reduced. A suitable time period will be readily chosen by a skilled person. In the illustrated embodiment, the predetermined time period is 24 hours. Once a provisioned SCAD instance is revoked, a user is required to go through the logon procedure described above in connection with FIGS. 4a and 4b in order to obtain a new instance of a provisioned SCAD. Advantageously the SCAD validity is controlled exclusively by the identity module in the server allowing changes to be made on a user level (e.g. high risk users may have hourly destruction of the SCAD enforced and the user must re-logon to create a new SCAD every hour).

Referring now to FIG. 6b, following transmission of the encrypted payment instrument data, HTE, the server risk engine determines whether any action is deemed necessary from a security perspective. This determination is performed in the manner described earlier in connection with box 502. In the event that action is deemed necessary, in box 624 the HTE application 208 receives degradation instructions and in box 626 the HTE application acts upon the degradation instructions to degrade its functionality. This is as described earlier in connection with boxes 330 and 316, respectively. The degradation instructions may include instructions to revoke the provisioned instance of SCAD 210.

Optionally, in box 628, HTE application 208 may receive one or more remedial action instruction(s) from data centre 106. The remedial action instructions specify actions that can be taken by HTE application 208 in order to rectify the degradation of functionality, as described earlier in this specification.

In the event that the server risk engine does not deem it necessary to take any action, the process moves to box 630 where the HTE application receives a message from payment switch 132 that indicates whether the transaction succeeded or failed. The transaction success and failure messages are known in the art and so are not described in detail here. HTE application indicates the success or failure of the transaction to the user via an appropriate GUI element, such as text displayed on display 118. At this point, a success message indicates that a payment has been successfully made using the application-based payment terminal. Optionally, in this case a user may be provided with a means to obtain a receipt for the transaction, e.g. entering an email address, or telephone number into an appropriate GUI element of HTE application 208. Alternatively or additionally, HTE application may be configured to connect to a printer in order to print a receipt for the transaction. As a further alternative, in the case where the payment instrument is itself an electronic device, HTE application 208 may be configured to instruct NFC controller 124 to transmit an electronic receipt to the payment instrument using NFC antenna 126. Other means for providing an electronic receipt known to a skilled person may additionally or alternatively be used.

Figure 7:
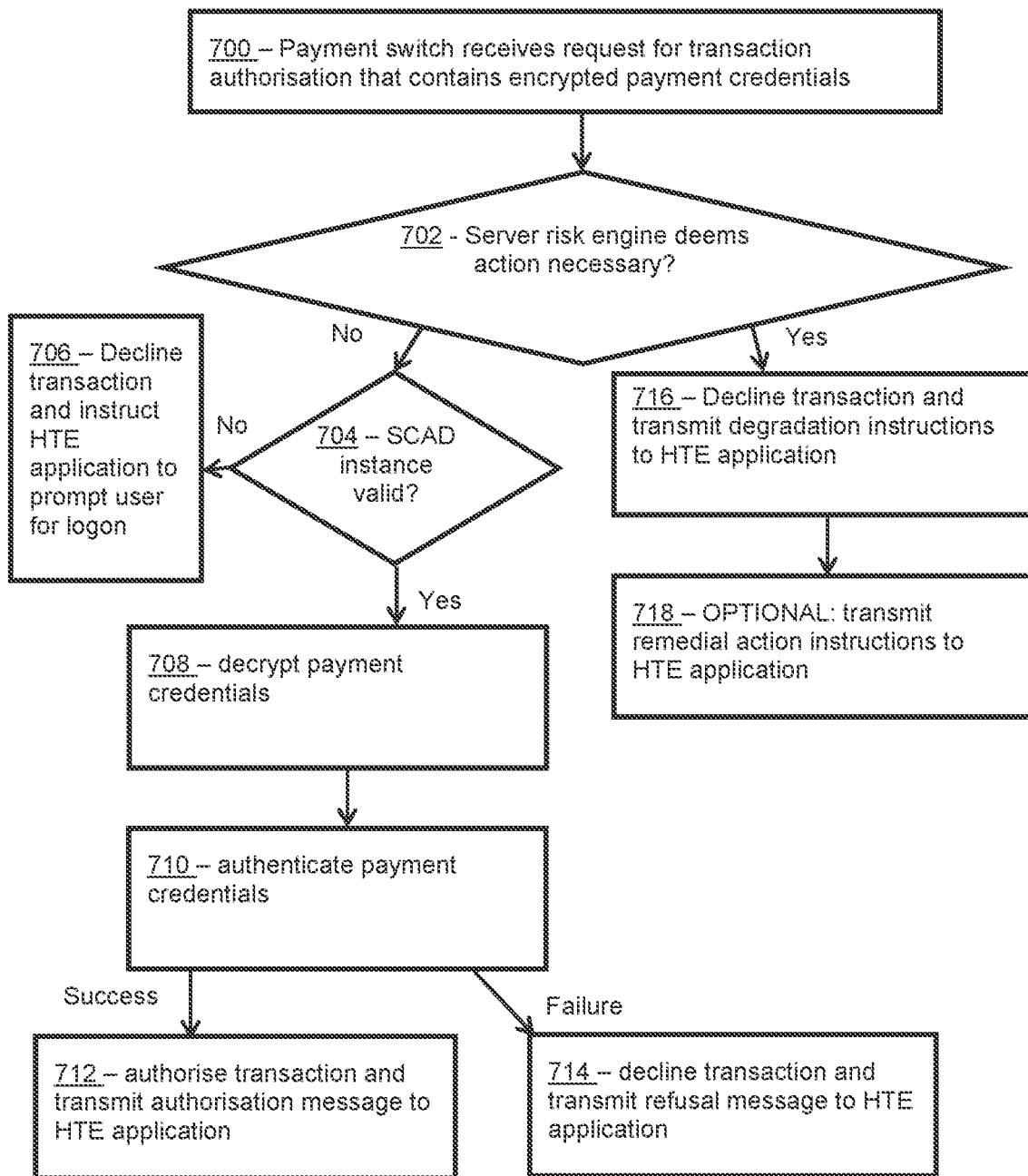
FIG. 7 is a flow diagram showing a server-side process for taking an electronic payment using an electronic device implementing the present invention.

FIG. 7 shows the process by which data centre 106 processes a payment. In box 700, payment switch 132 receives a request for authorisation of a transaction. The request includes encrypted payment credentials, where the payment credentials have been encrypted based on an encryption key that payment switch 132 has previously provisioned to SCAD 210. Following this, in box 702 the server risk engine determines whether any action is deemed necessary from a security perspective. This determination is performed in the manner described earlier in connection with box 326.

In the event that no action is deemed necessary by server risk engine 130, then the process moves to box 704 in which the server risk engine determines whether the SCAD instance that generated the encrypted payment credentials is a valid SCAD instance. A SCAD instance may be invalid, for example, if it has existed for longer than a predetermined time period, e.g. 24 hours. A SCAD instance may also be invalid for other reasons including but not limited to using encryption keys known to have been compromised. In the event that the SCAD instance is invalid, the process moves to box 706 where the payment switch 132 declines the transaction and instructs the HTE application to request that the user logon to HTE application again. This logon (if successful) creates a new, valid instance of SCAD 210 so that the payment can be attempted again.

In the event that the SCAD instance is determined to be valid, the process moves to box 708 where payment switch 132 decrypts the payment credentials. Decryption is performed using a decryption key that is complementary to the encryption key that was used by SCAD 210 to encrypt the payment credentials. The relationship between the encryption and decryption keys will depend on the encryption algorithm used. Advantageously, since each SCAD instance is provisioned based on a unique encryption key generated as part of the user logon, obtaining an encryption key from one instance of a SCAD will not allow a third party to spoof payment credentials using another instance of a SCAD. In addition, since the compromised instance of the SCAD will become invalid after a predetermined time period (e.g. 24 hours), the amount of fraudulent activity that can be carried out using a compromised SCAD is limited.

In box 710, payment switch 132 authenticates the decrypted payment credentials. Authentication of payment credentials is well known in the art and so this process is not described in detail here. If the authentication is successful, in box 712 the payment switch authorises the transaction and transmits an authorisation message to the HTE application. Authorisation messages are well known in the art. Alternatively, if the transaction is not authenticated, then in box 714 payment switch 132 transmits a 'transaction declined' or 'not authorised' message to the HTE application. Transaction declined messages are also well known in the art.

Returning to box 702, in the event that the server risk engine deems that it is necessary to take action, the process moves to box 716 where the transaction is declined by payment switch 132 and degradation instructions are transmitted to the HTE application. Optionally, remedial action instructions may also be transmitted to the HTE application. This is as described earlier in connection with boxes 516 and 518.

It will be appreciated by a skilled person having the benefit of the present disclosure that the security checking process shown and described in connection with FIG. 3 can be carried out at any time during the use of the HTE application as deemed suitable by a skilled person. Thus, the present invention is not limited to the local risk engine checking the device status at the particular points in the process that have been illustrated in the figures. The local risk engine can check the device status at additional points in the process, or at alternative points in the process, and the resulting embodiments are also within the scope of the present invention. Additionally, the server risk engine can at any time request an update of the security status of the electronic device. The server risk engine can also at any time transmit instructions to HTE application 208 to prompt the HTE application to take some action relating to security, even in the case where no security alert has been raised by the local risk engine.

FIG. 8 shows electronic device 104 having a GUI element that is part of HTE application 208 that assists the cardholder in locating their payment instrument in the NFC read zone of NFC antenna 126. The position of NFC antenna 126 within electronic device 104 is shown by an 'X'. The GUI element provides an indication 800, in this case a dashed square shown on display 118, indicating the extents of the read zone for NFC antenna 126. The indication can take many other forms, including but not limited to: a coloured indicia such as a dot or series of dots or other shapes, an arrow or series of arrows, text such as 'Place your card here', an image of a payment instrument or an outline of a payment instrument. Indication 800 may be dynamic such that it changes with time; e.g. the indication may be an animation such as a pulsing shape or a shape that changes colour. Indication 800 may not be visual; for example, electronic device 104 may emit a tone and/or provide haptic feedback to guide the cardholder to correctly locate their payment instrument. Indication may be a combined visual and audio indication, for example. Many other forms for indication 800 will be apparent to a skilled person having the benefit of the present disclosure. The particular sound that is known in the art for indicating that a card has been read by prior art contactless payment terminals may form part or all of indication 800.

In the embodiment of FIG. 8, the location of NFC antenna 126 is predetermined and provided to HTE application 208 in the form of a NFC antenna location file that contains NFC antenna locations for a set of device makes and models. In this case when HTE application 208 is required to generate indication 800, it identifies the make and model of electronic device 104 and looks up the location of the NFC antenna for the relevant device in the NFC antenna location file. The location of NFC antenna 126 for each model may be determined by requesting this information from the device manufacturer, or by experimental methods such as measuring the NFC antenna emissions as a function of position relative to the device. This information may also be gathered in a 'crowdsourcing' manner as described below in connection with FIG. 9.

In another embodiment as shown in FIG. 9, the GUI element provides feedback that guides the cardholder towards locating their payment instrument in the NFC read zone. FIG. 9 shows an NFC read zone 900 and an NFC detection zone 902. Feedback is provided in a GUI element 906 by analysing the change in the strength of the signal received from payment instrument NFC antenna 109 as a function of time. In the illustrated embodiment the feedback is textual; specifically, the user is provided with a range of phrases that indicates how close payment instrument 102 is currently located to read zone 900. For example, the phrases can include the text 'cold', 'colder' and 'warmer'. In this example the phrase 'cold' would be displayed when the payment instrument is outside detection zone 902. 'Warmer' would be displayed when the payment instrument is within detection zone 902 and is being moved towards read zone 900, and 'colder' would be displayed when the payment instrument is within detection zone 902 and is being moved away from read zone 900. HTE application 208 can determine which phrase is appropriate based on an analysis of the change in the strength of the signal received from payment instrument NFC antenna 109. The following exemplary calculations may be used by HTE application 208 to determine which phrase to display:

| Signal strength at time $t_2$ | Phrase to display |
| --- | --- |
| Zero/undetectable | Cold |
| $S(t_2) > S(t_1)$ | Warmer |
| $S(t_2) < S(t_1)$ | Colder |

In the above, S represents an appropriate measure of signal strength (e.g. absolute magnitude), $t_1$ is a first, earlier time and $t_2$ is a second, later time. HTE application 208 may be configured to periodically check the strength of the signal received from NFC antenna 109 in order to determine values for the signal strength S. The frequency at which checks are performed is preferably chosen so that real time or near real time feedback is provided. A suitable polling frequency may be in the range 5 Hz to 20 Hz, i.e. checking the signal strength S once every 50 to 200 milliseconds. The invention is however not limited to this and other rates of checking may be used instead.

The invention is not limited to textual feedback as described above. The feedback can take many other forms; for example, a sound that may change in pitch or volume or frequency of beeps according to the proximity of payment instrument 102 to read zone 900. Alternative visual indicia may be used in place of or in addition to text; for example, a GUI element that changes colour, size, shape, etc., in response to the detected change in signal strength. Other suitable forms of feedback will become apparent to a skilled person having the benefit of the present disclosure.

Optionally, HTE application 208 may be configured to offer the user and/or cardholder the opportunity to indicate the location of payment instrument 102 when a successful read occurred. The user and/or cardholder may provide this information via user input module 116. The provision of this information is preferably not compulsory. In the case that user input module 116 is a touchscreen, the user and/or cardholder may touch the touchscreen at the position where payment instrument 102 was located when a successful read occurred. HTE application 208 may record the location from a number of successful read operations and analyse this data to determine the location of NFC antenna 126. This process may involve statistical analysis, e.g. a determination of the mean location based on a number of user inputs. The standard deviation of the mean may be used as a measure of the confidence in the current value of the mean. Other appropriate forms of analysis including machine learning will become apparent to a skilled person having the benefit of the present disclosure.

Once the location of NFC antenna 126 has been determined with enough certainty, HTE application 208 may switch to operating in the mode described in connection with FIG. 8 in which an indication 800 is provided to guide the user directly to the NFC read zone. Alternatively, a combination of FIGS. 8 and 9 may be used in which the user is guided to an indication 800.

The location of NFC antenna 126 as determined by the calculated mean may be transmitted to data centre 106 by the HTE application, along with a device make and model, so that data centre 106 can build up a picture over time of the location of NFC antenna 126 for each particular make and model of electronic device. This information can be analysed by data centre 106 and included in a future release of HTE application files 200, to enable future versions of the HTE application to provide an indication 800 as described above in connection with FIG. 8.

The aspect of the invention shown in FIGS. 8 and 9 has been described in the context of NFC antennas. However, it will be appreciated that the invention is not limited to NFC antennas and that the disclosure in connection with FIGS. 8 and 9 is equally applicable to other types of wireless communication antennas, e.g. RFID antennas.

Numerous modifications, adaptations and variations to the embodiments described herein will become apparent to a person skilled in the art having the benefit of the present disclosure, and such modifications, adaptations and variations that result in additional embodiments of the present invention are also within the scope of the accompanying claims.

The invention claimed is:

1. A computer implemented method for processing payment transactions initiated from a payment terminal application of a mobile electronic device, the method comprising:
receiving at a server, over an electronic network, an authentication request to authenticate an identity of a merchant operating the payment terminal application of the mobile electronic device, the authentication request comprising user credentials of a user linked to the merchant received via a user input module of the mobile electronic device;
authenticating, at the server, the identity of the merchant if the user credentials received over the electronic network from the mobile electronic device are validated;
in response to authenticating the identity of the merchant, transmitting, one or more encryption keys from a payment switch of the server to the payment terminal application of the mobile electronic device;
receiving, by the payment terminal application of the mobile electronic device, the one or more encryption keys;
in response to receiving the one or more encryption keys, provisioning, in a volatile storage module on the mobile electronic device, a software card acceptance device (SCAD) instance using the one or more encryption keys, the provisioning comprising provisioning the mobile electronic device to emulate a payment terminal;
executing, on the mobile electronic device, the payment terminal application to take an electronic payment, the executing comprising communicating with a payment instrument to obtain payment instrument data from the payment instrument via a wireless communication module of the mobile electronic device;
encrypting, by the mobile electronic device, the payment instrument data of the payment instrument using the one or more encryption keys;
receiving at the server, over the electronic network and from the mobile electronic device, the encrypted payment instrument data based on the mobile electronic device emulating the payment terminal to take the electronic payment via the payment terminal application that is executing on the mobile electronic device by communicating with the payment instrument to obtain the payment instrument data from the payment instrument via the wireless communication module of the mobile electronic device; and
processing a payment transaction at the server based on the payment instrument data received from the wireless communication module of the mobile electronic device and the identity authenticated based on the user credentials.

2. The computer implemented method of claim 1, further comprising:
if authentication of the merchant identity is declined based on exceeding a maximum permitted number of submissions of un-validated user credentials:
declining authentication; and
transmitting instructions to the payment terminal application of the mobile electronic device for blocking or timing-out submission of user credentials.

3. The computer implemented method of claim 1, further comprising:

if authentication of the merchant identity is declined based on failure to validate the user credentials:

declining authentication; and transmitting degradation instructions or remedial action instructions to the payment terminal application of the mobile electronic device.

4. The computer implemented method of claim 1, wherein the mobile electronic device comprises the wireless communication module, a user input module, and a network interface module, all integrated with the mobile electronic device, and wherein the method further comprises:

receiving, at the payment terminal application of the mobile electronic device via the user input module of the mobile electronic device, the user credentials of the user linked to the merchant;

transmitting the authentication request the server via the network interface module of the mobile electronic device, the authentication request comprising the user credentials;

receiving an authentication response from the server at the payment terminal application of the mobile electronic device; and receiving the payment instrument data of the payment instrument via the wireless communication module of the mobile electronic device.

5. The computer implemented method of claim 4, further comprising:

if the authentication response comprises an indication that authentication was successful, then receiving and storing at least one encryption key received from the server in the volatile storage module of the mobile electronic device.

6. The computer implemented method of claim 4, wherein the user credentials are received via a touch-sensitive display screen of the mobile electronic device.

7. The computer implemented method of claim 4, the method further comprising:

performing at least one security check using a local risk engine of the mobile electronic device by:

obtaining information relating to a security status of the mobile electronic device;

processing one or more local risk engine rules from a local risk engine rule set using the obtained information; and determining whether to raise one or more security events based on the processed one or more local risk engine rules.

8. The computer implemented method of claim 7, the method further comprising:

raising at least one security event relating to the security status of the mobile electronic device;

storing the at least one raised security event in a security event log;

processing the security event log using the local risk engine of the mobile electronic device; and degrading functionality of the payment terminal application based on a first degradation instruction received from the local risk engine, the degradation including at least one of requiring re-input of the user credentials, preventing transmission of the authentication request, terminating the method, and invalidating stored cardholder information and encryption keys.

9. A system for processing payment transactions initiated from a payment terminal application of a mobile electronic device, the system comprising:

a processor; and a computer-readable medium storing instructions that, when executed by the processor, cause the processor to perform a method including:

receiving at a server, over an electronic network, an authentication request to authenticate an identity of a merchant operating the payment terminal application of the mobile electronic device, the authentication request comprising user credentials of a user linked to the merchant received via a user input module of the mobile electronic device;

authenticating, at the server, the identity of the merchant if the user credentials received over the electronic network from the mobile electronic device are validated;

in response to authenticating the identity of the merchant, transmitting, one or more encryption keys from a payment switch of the server to the payment terminal application of the mobile electronic device;

receiving, by the payment terminal application of the mobile electronic device, the one or more encryption keys;

in response to receiving the one or more encryption keys, provisioning, in a volatile storage module on the mobile electronic device, a software card acceptance device (SCAD) instance using the one or more encryption keys, the provisioning comprising provisioning the mobile electronic device to emulate a payment terminal;

executing, on the mobile electronic device, the payment terminal application to take an electronic payment, the executing comprising communicating with a payment instrument to obtain payment instrument data from the payment instrument via a wireless communication module of the mobile electronic device;

encrypting, by the mobile electronic device, the payment instrument data of the payment instrument using the one or more encryption keys;

receiving at the server, over the electronic network and from the mobile electronic device, the encrypted payment instrument data, based on the mobile electronic device emulating the payment terminal to take the electronic payment via the payment terminal application that is executing on the mobile electronic device by communicating with the payment instrument to obtain the payment instrument data from the payment instrument via the wireless communication module of the mobile electronic device; and processing a payment transaction at the server based on the payment instrument data received from the wireless communication module of the mobile electronic device and the identity authenticated based on the user credentials.

10. The system of claim 9, the method further comprising:

if authentication of the merchant identity is declined based on exceeding a maximum permitted number of submissions of un-validated user credentials:

declining authentication; and transmitting instructions to the payment terminal application of the mobile electronic device for blocking or timing-out submission of user credentials.

11. The system of claim 9, the method further comprising:
if authentication of the merchant identity is declined based on failure to validate the user credentials:
declining authentication; and
transmitting degradation instructions or remedial action instructions to the payment terminal application of the mobile electronic device.

12. The system of claim 9, wherein the mobile electronic device
comprises the wireless communication module, a user input module, and a network interface module, all integrated with the mobile electronic device, and
wherein the method further comprises:
receiving, at the payment terminal application of the mobile electronic device via the user input module of the mobile electronic device, the user credentials of the user linked to the merchant;
transmitting the authentication request the server via the network interface module of the mobile electronic device, the authentication request comprising the user credentials;
receiving an authentication response from the server at the payment terminal application of the mobile electronic device; and
receiving the payment instrument data of the payment instrument via the wireless communication module of the mobile electronic device.

13. The system of claim 12, the method further comprising:
if the authentication response comprises an indication that authentication was successful, then receiving and storing at least one encryption key received from the server in the volatile storage module of the mobile electronic device.

14. The system of claim 12, wherein the user credentials are received via a touch-sensitive display screen of the mobile electronic device.

15. The system of claim 12, the method further comprising:
performing at least one security check using a local risk engine of the mobile electronic device by:
obtaining information relating to a security status of the mobile electronic device;
processing one or more local risk engine rules from a local risk engine rule set using the obtained information; and
determining whether to raise one or more security events based on the processed one or more local risk engine rules.

16. The system of claim 15, the method further comprising:
raising at least one security event relating to the security status of the mobile electronic device;
storing the at least one raised security event in a security event log;
processing the security event log using the local risk engine of the mobile electronic device; and
degrading functionality of the payment terminal application based on a first degradation instruction received from the local risk engine, the degradation including at least one of requiring re-input of the user credentials, preventing transmission of the authentication request, terminating the method, and invalidating stored cardholder information and encryption keys.

17. One or more non-transitory machine-readable mediums storing instructions that, when executed by one or more computing systems, cause the one or more computing systems to:
receive at a server, over an electronic network, an authentication request to authenticate an identity of a merchant operating a payment terminal application of a mobile electronic device, the authentication request comprising user credentials of a user linked to the merchant received via a user input module of the mobile electronic device;
authenticate, at the server, the identity of the merchant if the user credentials received over the electronic network from the mobile electronic device are validated;
in response to authenticating the identity of the merchant, transmit, one or more encryption keys from a payment switch of the server to the payment terminal application of the mobile electronic device;
receive, by the payment terminal application of the mobile electronic device, the one or more encryption keys;
in response to receiving the one or more encryption keys, provision, in a volatile storage module on the mobile electronic device, a software card acceptance device (SCAD) instance using the one or more encryption keys, the provisioning comprising provisioning the mobile electronic device to emulate a payment terminal;
execute, on the mobile electronic device, the payment terminal application to take an electronic payment, the executing comprising communicating with a payment instrument to obtain payment instrument data from the payment instrument via a wireless communication module of the mobile electronic device;
encrypt, by the mobile electronic device, the payment instrument data of the payment instrument using the one or more encryption keys;
receive at the server, over the electronic network and from the mobile electronic device, the encrypted payment instrument data, based on the mobile electronic device emulating the payment terminal to take the electronic payment via the payment terminal application that is executing on the mobile electronic device by communicating with the payment instrument to obtain the payment instrument data from the payment instrument via the wireless communication module of the mobile electronic device; and
process a payment transaction at the server based on the payment instrument data received from the wireless communication module of the mobile electronic device and the identity authenticated based on the user credentials.

18. The non-transitory machine-readable medium of claim 17, further comprising:
if authentication of the merchant identity is declined based on exceeding a maximum permitted number of submissions of un-validated user credentials:
declining authentication; and
transmitting instructions to the payment terminal application of the mobile electronic device for blocking or timing-out submission of user credentials.

19. The non-transitory machine-readable medium of claim 17, further comprising:
- if authentication of the merchant identity is declined based on failure to validate the user credentials:
  - declining authentication; and
  - transmitting degradation instructions or remedial action instructions to the payment terminal application of the mobile electronic device.

20. The non-transitory machine-readable medium of claim 17, wherein the mobile electronic device comprises the wireless communication module, a user input module, and a network interface module, all integrated with the mobile electronic device, and further comprises:
- receiving, at the payment terminal application of the mobile electronic device via the user input module of the mobile electronic device, the user credentials of the user linked to the merchant;
- transmitting the authentication request the server via the network interface module of the mobile electronic device, the authentication request comprising the user credentials;
- receiving an authentication response from the server at the payment terminal application of the mobile electronic device; and
- receiving the payment instrument data of the payment instrument via the wireless communication module of the mobile electronic device.

* * * * *

UNITED STATES PATENT AND TRADEMARK OFFICE
CERTIFICATE OF CORRECTION

| | |
|---|---|
| PATENT NO. | : 12,125,018 B2 |
| APPLICATION NO. | : 16/197628 |
| DATED | : October 22, 2024 |
| INVENTOR(S) | : Jonathan Stewart Vokes and Nicholas Telford-Reed |

It is certified that error appears in the above-identified patent and that said Letters Patent is hereby corrected as shown below:

In the Claims

In Column 32, Line 44, Claim 1, delete "data" and insert --data,--.

Signed and Sealed this
Third Day of December, 2024

Katherine Kelly Vidal
*Director of the United States Patent and Trademark Office*